US012763340B2

(12) United States Patent
Kim et al.

(10) Patent No.: US 12,763,340 B2
(45) Date of Patent: Oct. 13, 2026

(54) MEMBRANE ELECTRODE ASSEMBLY CATALYST MATERIAL

(71) Applicant: Robert Bosch GmbH, Stuttgart (DE)

(72) Inventors: Soo Kim, Fremont, CA (US); Ulrich Berner, Stuttgart (DE); Charles Tuffile, Swansea, MA (US); Mordechai Kornbluth, Brighton, MA (US)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 17/514,534

(22) Filed: Oct. 29, 2021

(65) Prior Publication Data

US 2023/0132969 A1 May 4, 2023

(51) Int. Cl.

| | |
|---|---|
| ***H01M 4/92*** | (2006.01) |
| ***C25B 1/02*** | (2006.01) |
| ***C25B 11/075*** | (2021.01) |
| ***H01M 4/86*** | (2006.01) |
| ***H01M 8/10*** | (2016.01) |
| ***H01M 8/1004*** | (2016.01) |

(52) U.S. Cl.

CPC ............... *H01M 4/923* (2013.01); *C25B 1/02* (2013.01); *C25B 11/075* (2021.01); *H01M 4/8652* (2013.01); *H01M 8/1004* (2013.01); *H01M 2008/1095* (2013.01)

(58) Field of Classification Search

CPC ......... C25B 11/075–081; C25B 11/091; C25B 11/093; C25B 11/097; B01J 23/468; B01J 23/89–8926; B01J 23/56–6567; B01J 23/002

See application file for complete search history.

(56) References Cited

U.S. PATENT DOCUMENTS

| | | | | |
|---|---|---|---|---|
| 4,108,745 A * | 8/1978 | Cipris | C25B 11/091 204/290.14 |
| 6,210,550 B1 * | 4/2001 | Nidola | C25C 7/02 204/291 |
| 9,561,497 B2 | 2/2017 | Kumta et al. | |

(Continued)

FOREIGN PATENT DOCUMENTS

| | | |
|---|---|---|
| CN | 104294311 B | 4/2017 |
| EP | 3719898 A1 | 7/2020 |

OTHER PUBLICATIONS

Alves et al, "Surface characterisation of IrO2/TiO2/CeO2 oxide electrodes and Faradaic impedance investigation of the oxygen evolution reaction from alkaline solution", Electrochimica Acta, Dec. 1, 1998, vol. 44, pp. 1525-1534. (Year: 1998).*

(Continued)

*Primary Examiner* — Alexander W Keeling
*Assistant Examiner* — Andrew Koltonow
(74) *Attorney, Agent, or Firm* — BROOKS KUSHMAN P.C.

(57) ABSTRACT

A catalyst for a membrane electron assembly (MEA) comprising: a ternary oxide material having at least one composition of formula (I): $Ir_xM_{1-x}O_2$ (I), where x is any number between about 0.25 and 0.75, and M is Ag, Au, Ba, Bi, Ca, Ce, Eu, Ge, Hf, La, Nd, Os, Pd, Pr, Re, Rh, Se, Sm, Tl, or W, the material being configured to catalyze oxygen evolution reaction (OER) and increase stability, activity, or both of the catalyst.

18 Claims, 5 Drawing Sheets

Categorization of each studied $Ir_{0.5}M_{0.5}O_2$ species (*vs.* pure $IrO_2$) based on chemical reactions against H, $H_2O$, OH, OOH, O, and CO and thermodynamic decomposition

(56) References Cited

U.S. PATENT DOCUMENTS

| | | | |
|---|---|---|---|
| 9,861,973 B2 | 1/2018 | Roller et al. | |
| 10,041,179 B2 | 8/2018 | Kumta et al. | |
| 10,435,803 B2 | 10/2019 | Kumta et al. | |
| 2007/0292744 A1* | 12/2007 | Lopez | H01M 8/186 429/418 |
| 2012/0085571 A1* | 4/2012 | Niksa | C25B 11/093 174/258 |
| 2013/0084474 A1 | 4/2013 | Mills | |
| 2013/0330651 A1* | 12/2013 | Thompsett | H01M 4/8657 429/525 |
| 2016/0079604 A1 | 3/2016 | Atanasoski et al. | |
| 2016/0083857 A1 | 3/2016 | Kar et al. | |
| 2017/0244109 A1* | 8/2017 | O'Malley | C25B 9/23 |
| 2017/0356095 A1* | 12/2017 | Ivanter | H01M 4/8817 |
| 2020/0131651 A1 | 4/2020 | Kumta et al. | |

OTHER PUBLICATIONS

Lebedev et al, "Highly Active and Stable Iridium Pyrochlores for Oxygen Evolution Reaction", Chemistry of Materials, May 31, 2017, vol. 29, pp. 5182-5191. (Year: 2017).*

Kong et al, "Fabrication of Pt/IrO2Nb205-rGO Electrocatalyst by Support Improvement for Oxygen Reduction Reaction", Jun. 21, 2019, Catalysis Letters, 149, 3041-3047. (Year: 2019).*

Alves et al, "Surface characterisation of IrO2/TiO2/CeO2 oxide electrodes and Faradaic impedance investigation of the oxygen evolution reaction from alkaline solution", 1998, Electrochimica Acta, 44, 1525-1534. (Year: 1998).*

Ten Kortenaar et al, "Oxygen evolution and reduction on iridium oxide compounds", 1995, Journal of Power Sources, 56, 51-60. (Year: 1995).*

International Search Report dated Feb. 3, 2023 issued in a related application PCT/EP2022/080291.

Prasad Prakash Patel et al., "Highly active robust oxide solid solution electro-catalysts for oxyben reduction reaction for proton exchange membrane fuel cell and direct methanol fuel cell cathodes," International Journal of Hydrogen Energy, vol. 42 (2017) 24079-24089.

Ledendecker et al., "Towards maximized utilization of iridium for the acidic oxygen evolution reaction," Nano Research, Tsinghua Unviersity Press, CN, vol. 12, No. 9, Mar. 28, 2019, 2275-2280.

* cited by examiner

Categorization of each studied $Ir_{0.5}M_{0.5}O_2$ species (*vs.* pure $IrO_2$) based on chemical reactions against H, $H_3O$, OH, OOH, O, and CO and thermodynamic decomposition Categorization of each studied $Ir_{0.25}M_{0.75}O_2$ species (*vs.* pure $IrO_2$) based on chemical reactions against H, $H_3O$, OH, OOH, O, and CO and thermodynamic decomposition

MEMBRANE ELECTRODE ASSEMBLY CATALYST MATERIAL

TECHNICAL FIELD

The present disclosure relates to ternary and quaternary iridium oxide catalyst materials for membrane electrode assemblies (MEA) for hydrogen-generating devices, a method of identifying the same, and a method of producing the same.

BACKGROUND

Hydrogen-producing devices such as fuel cells and electrolyzers are becoming increasingly popular due to their ability to produce clean energy. But cost of their individual components has remained to be a hurdle to large scale production. Due to the harsh environment of the fuel cells and electrolyzers, only a limited number of materials has been identified as suitable for production of their components such as electrodes and reaction catalysts. Most of the traditional materials include rare elements which are cost prohibitive.

SUMMARY

In an embodiment, a catalyst for a membrane electron assembly (MEA) is disclosed. The catalyst includes a ternary oxide material having at least one composition of formula (I):

$$Ir_xM_{1-x}O_2 \quad (I),$$

where x is any number between about 0.25 and 0.75, and

M is Ag, Au, Ba, Bi, Ca, Ce, Eu, Ge, Hf, La, Nd, Os, Pd, Pr, Re, Rh, Se, Sm, Tl, or W, the material being configured to catalyze an oxygen evolution reaction (OER) and to increase stability, activity, or both of the catalyst. The MEA may be a polymer-electron membrane (PEM) MEA. The MEA may be a fuel cell MEA. The catalyst may include a first composition and a second composition of the formula (I), the first and second compositions having different M, x values, or both. M may be Bi. x may be about 0.25 to 0.5. The catalyst may further include at most about 50 wt. % of Ir, Ru, $IrO_2$, $RuO_2$, or a combination thereof, based on the total weight of the catalyst. The ternary oxide material may form a nanoparticle layer on an anode of the MEA.

In another embodiment, a catalyst of a membrane electron assembly (MEA) is disclosed. The catalyst may include a quaternary oxide material having at least one composition of formula (II):

$$Ir_xBi_yM_zO_2 \quad (II),$$

where x, y, z is each individually and independently any number between about 0.25 and 0.75, x+y+z=1, and M is Ag, Au, Ba, Ca, Ce, Eu, Ge, Hf, La, Mo, Nb, Nd, Os, Pd, Pt, Pr, Re, Rh, Ru, Sb, Se, Sm, Sn, Ta, Tl, Ti, W, Y, or Zr, the material being configured to catalyze an oxygen evolution reaction (OER) and increase stability, activity, or both of the catalyst. The MEA may be a polymer-electron membrane (PEM) MEA. The MEA may be a MEA in a fuel cell stack. M may be Ce, Sb, Se, or Sn. The quaternary oxide material may include at least two different compositions of the formula (II). Each of the at least two compositions may have different constituents, but the same values of numeric subscripts. The catalyst may further include Ir, Ru, $IrO_2$, $RuO_2$, or a combination thereof.

In a yet another embodiment, a membrane electron assembly (MEA) is disclosed. The MEA may include an OER catalyst material having a first material including (a) a ternary oxide material having at least one composition of formula (I):

$$Ir_xM_{1-x}O_2 \quad (I),$$

where x is any number between about 0.25 and 0.75; and

M is Ag, Au, Ba, Bi, Ca, Ce, Eu, Ge, Hf, La, Nd, Os, Pd, Pr, Re, Rh, Se, Sm, Tl, or W, and (b) a quaternary oxide material having at least one composition of formula (II):

$$Ir_xBi_yM_zO_2 \quad (II)$$

where x, y, z is each individually and independently any number between about 0.25 and 0.75, x+y+z=1, and M is Ag, Au, Ba, Ca, Ce, Eu, Ge, Hf, La, Mo, Nb, Nd, Os, Pd, Pt, Pr, Re, Rh, Ru, Sb, Se, Sm, Sn, Ta, Tl, Ti, W, Y, or Zr, the material of the formulas (I) and (II) being configured to catalyze oxygen evolution reaction (OER) and increase stability, activity, or both of the catalyst. The MEA may be a polymer-electron membrane (PEM) MEA. The MEA may be a fuel cell MEA. M in the formula (II) may be Se, Sn, Sb, or Ce. M in the formula (I) may be Bi.

DETAILED DESCRIPTION

Figure 1:
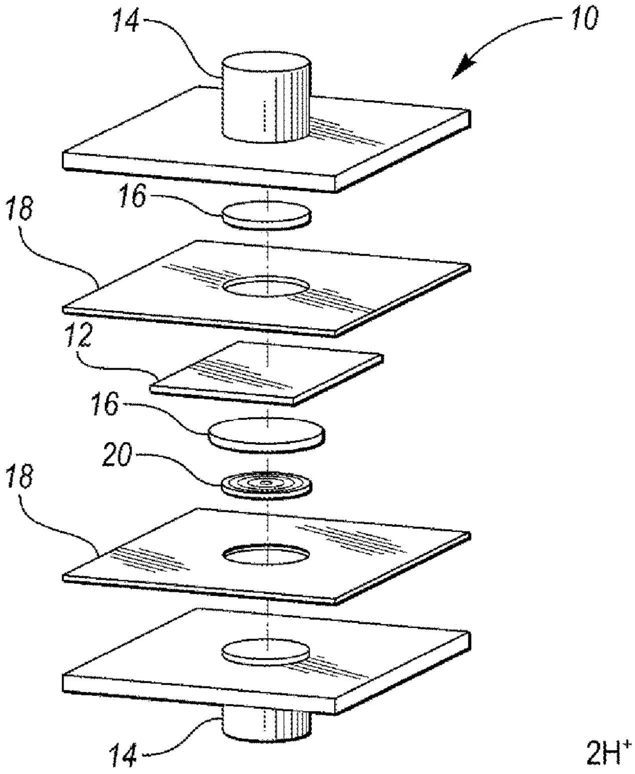
FIG. 1 is a schematic depiction of a non-limiting example of proton-exchange membrane fuel cell (PEMFC) including a MEA.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells, or electrochemical cells, that convert chemical energy of a fuel (e.g. $H_2$) and an oxidizing agent into electricity through a pair of electrochemical half (redox) reactions, have become an increasingly popular hydrogen-fuel-generating technology. Fuel cells are now a promising alternative transportation technology capable of operating without emissions of either toxins or green-house gases. One of the current limitations of wide-spread adoption of this clean and sustainable technology is related to clean production of $H_2$ fuel.

A proton-exchange membrane fuel cell (PEMFC) represents an environment friendly alternative to internal combustion engines for a variety of vehicles such as cars and buses. A PEMFC typically features a relatively high efficiency and power density. A very attractive feature of the PEMFC engine are no carbon emissions, provided that the hydrogen fuel has been gained in an environmentally friendly manner. Besides being a green engine, the PEMFC may be used in other applications such as stationary and portable power sources.

The PEMFC technology; however, presents a number of challenges connected to its maintenance, sustainable performance over time, longevity, and production cost. For example, the PEMFC has a highly corrosive environment requiring materials capable of withstanding the challenging conditions. While focus is on the overall performance of the fuel cells, incremental improvements of individual components of the PEMFC are needed.

A non-limiting example of a PEMFC is depicted in FIG. 1. A core component of the PEMFC 10 that helps produce the electrochemical reaction needed to separate electrons is the Membrane Electrode Assembly (MEA) 12. The MEA 12 includes subcomponents such as electrodes (cathode, anode), catalysts, and polymer electrolyte membranes. Besides MEA 12, the PEMFC 10 typically includes other components such as current collectors 14, gas diffusion layer(s) 16, gaskets 18, and bipolar plate(s) 20.

Different types of MEA may be incorporated, for example a proton-exchange membrane (PEM) electrolyzer stack. A PEM electrolyzer is an electrochemical device designed to convert electricity and water into hydrogen and oxygen, which may be in turn used to store energy. The PEM electrolyzer utilizes electrolysis for hydrogen production. Besides fuel cells, the PEM electrolyzer may be utilized in other applications including industrial, residential, and military applications and technologies focused on energy storage such as electrical grid stabilization from dynamic electrical sources including wind turbines, solar cells, or localized hydrogen production.

Figure 2:
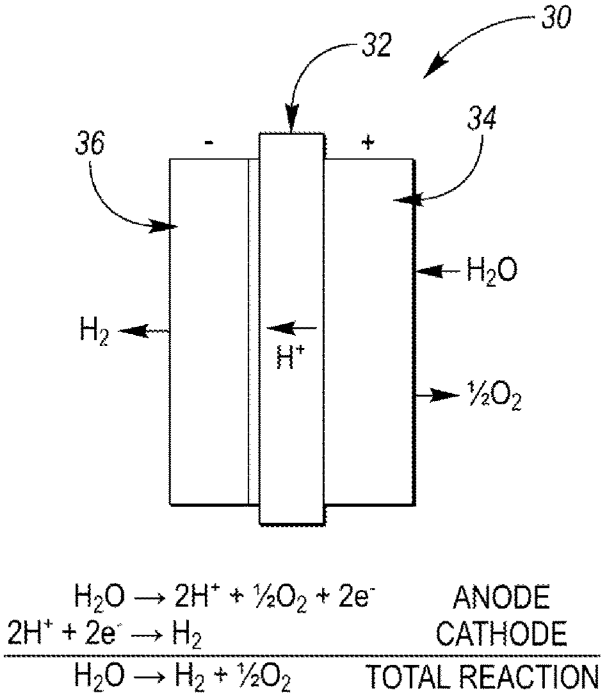
FIG. 2 shows schematically principles of electrolysis in a MEA.

A depiction of the electrolysis principal, utilized by a PEM electrolyzer, with relevant reactions is depicted in FIG. 2. The electrolyzer 30 includes the PEM 32, anode 34, and cathode 36. During electrolysis, water is broken down into oxygen and hydrogen in anodic and cathodic electrically driven evolution reactions. The reactant liquid water ($H_2O$) permeates through the anode 34 porous transportation layer (PTL) to the anode catalyst layer, where the oxygen evolution reaction (OER) occurs. The protons ($H^+$) travel via the PEM 32, and electrons (e−) conduct through an external circuit during the hydrogen evolution reaction (HER) at the cathode 36 catalyst layer. The anodic OER requires a much higher overpotential than the cathodic HER. It is the anodic OER which determines efficiency of the water splitting due to the sluggish nature of its four-electron transfer.

Different materials are used to produce the PEM electrolyzer 30. An example of the anode PTL layer material may be titanium (Ti) and the cathode PTL layer may be carbon-based materials such as carbon paper, carbon fleece, etc. The PEM 32, anode 34, and cathode 36 may be surrounded by bipolar or separator plates which may be made, for example, from Ti, or gold- or platinum-coated Ti metals.

Catalysts are typically used on the anode 34 and the cathode 36 to assist with the half-reaction processes. The typical catalyst material on the cathode 36 is platinum (Pt) while the typical catalyst used on the anode 34 is ruthenium (Ru), iridium (Ir), Ir—Ru, ruthenium oxide ($RuO_2$), iridium oxide ($IrO_2$), or iridium-ruthenium oxide (Ir—Ru—O) due to a combination of a relatively high activity and durability. But large-scale use and production of PEM electrolyzes, and fuel cells utilizing PEM electrolyzes, requires substantial amount of the catalyst materials, which poses a problem for the industry. Out of all PEM electrolyzer components, the anode catalyst is the most expensive constituent due to use of the rare metals Ir and/or Ru, and lack of opportunity to reduce its cost through economies-of-scale effects.

At the anode 34, Ir typically catalyzes the EOR ($H_2O \rightarrow 2H^+ + \frac{1}{2}O2 + 2e^-$); and, at the cathode 36, Pt typically catalyzes the HER ($2H^+ + 2e^- \rightarrow H_2$). The cell temperature typically ranges from 50 to 80° C. The cell voltage in the electrolyzer 30 is rather high compared to a fuel cell (greater than 1.23 V), typically ranging from 1.8 to 2.2 V vs. SHE at full load. Due to high operating voltage, the electrolyzer 30 materials may undergo further catalyst degradation (e.g., metal dissolution that can lead to the loss in electrochemically active surface area), which may affect the entire electrolyzer 30 stack system throughout its lifetime.

There are typically two important design factors for selecting the PEM electrolyzer anode 34 catalyst: 1) catalytic activity and 2) catalyst stability or durability during high voltage operation. While noble metals such as Ir, Ru, or Pt are known to be "immune" against corrosion, high voltage operation that oxidizes the surface of the metal may still trigger dissolution. For example, $IrO_2$ is actively used for PEM electrolyzer applications which can add value in terms of catalyst stability. Adding Ru (or another transition metal like Nb) to $IrO_2$ may increase the catalytic activity for the OER, when compared to pure $IrO_2$ catalyst. But Ru and the transition metal may leach out in the acidic environment with elevated voltage operation. This may lead to reduced electrochemical surface area (ECSA) loss and PEM electrolyzer degradation. Due to the dissolution of these expensive catalyst materials and high cost associated with their acquirement, a large-scale production is unsustainable, costly, and impracticable.

Additionally, the same electrolysis principles described above with respect to the PME electrolyzer 30 apply to the PEMFC anode. When the fuel cell is operated under harsh operating conditions such as rapid load change or subzero start-up, fuel starvation may occur. Upon the fuel starvation at the anode, hydrogen is no longer sufficient to provide the needed protons and electrons so water electrolysis reaction and carbon corrosion may occur. The corrosion may deteriorate and compromise the anode materials. To prevent the degradation, an OER catalyst may be added to the anode to promote water electrolysis reaction over carbon corrosion.

Thus, there is a need to identify alternative materials with high activity, good stability, and strong acid tolerance at high oxidation potentials which may fully or at least partially replace Ir and Ru as catalysts at the electrolyzer anode 34 and/or at the PEMFC anode.

In one or more embodiments, a material is disclosed. The material may be a binary oxide. The material may be an OER catalyst material. The material may be a first, second, and/or third material. The material may include, comprise, consist essentially of, or consist of one or more compositions of formula (I):

$$Ir_xM_{1-x}O_2 \quad \text{(I)},$$

where x is any number between about 0.1 and 0.99, and

M is an element from the Period 4, 5, or 6 of the Periodic Table of Elements.

In formula (I), x may be any number between about 0.1 and 0.99. x may be about 0.1, 0.2, 0.3, 0.4, 0.5, 0.6, 0.7, 0.8, 0.9, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or a range including any two of the disclosed numerals. A non-limiting example of the range may be about 0.25-0.50, 0.50-0.75, or 0.25-0.75. Another non-limiting example of the range may be about 0.10-0.90, 0.20-0.80, or 0.30-0.70.

In formula (I), at least the following condition may apply: $x+(1-x)=1$.

In formula (I), M may be an element from Period 4 of the Periodic Table of Elements and may include Ca, Ti, Ge; Period 5 of the Periodic Table of Elements and may include Y, Zr, Nb, Mo, Rh, Pd, Ag, Sn, Sb; or Period 6 of the Periodic Table of Elements and may include Ba, La, Ce, Pr, Nd, Sm, Eu, Hf, Ta, W, Re, Os, Pt, Au, Tl, or Bi. In formula (I), M may be from Group IIA, IIIA, IVA, VA, VIA, IB, IIB, IIIB, IVB, VB, VIB, VIIB, or VIIIB. In formula (I), M may be an alkaline earth metal, coinage metal, volatile metal, icoasagen, tetrel, pentel, chalcogen, transition metal, port-transition metal, metalloid, nonmetal, or lanthanoid.

In formula (I), M may be an element selected from the group consisting of Ca, Ti, Ge, Y, Zr, Nb, Mo, Rh, Pd, Ag, Sn, Sb, Ba, La, Ce, Pr, Nd, Sm, Eu, Hf, Ta, W, Re, Os, Pt, Au, Tl, and Bi. In formula (I), M may be an element selected from the group consisting of Ag, Au, Ba, Bi, Ca, Ce, Eu, Ge, Hf, La, Nd, Os, Pd, Pr, Re, Rh, Sb, Se, Sm, Sn, Tl, and W. In formula (I), M may be an element selected from the group consisting of Bi, Ce, Sb, Se, and Sn.

Non-limiting examples of binary oxides of formula (I) may include $Ir_xCa_{x-1}O_2$, $Ir_xTi_{x-1}O_2$, $Ir_xGe_{x-1}O_2$, $Ir_xY_{x-1}O_2$, $Ir_xZr_{x-1}O_2$, $Ir_xNb_{x-1}O_2$, $Ir_xMo_{x-1}O_2$, $Ir_xRh_{x-1}O_2$, $Ir_xPd_{x-1}O_2$, $Ir_xAg_{x-1}O_2$, $Ir_xSn_{x-1}O_2$, $Ir_xSb_{x-1}O_2$, $Ir_xBa_{x-1}O_2$, $Ir_xLa_{x-1}O_2$, $Ir_xCe_{x-1}O_2$, $Ir_xPr_{x-1}O_2$, $Ir_xNd_{x-1}O_2$, $Ir_xSm_{x-1}O_2$, $Ir_xEu_{x-1}O_2$, $Ir_xHf_{x-1}O_2$, $Ir_xTa_{x-1}O_2$, $Ir_xW_{x-1}O_2$, $Ir_xRe_{x-1}O_2$, $Ir_xOs_{x-1}O_2$, $Ir_xPt_{x-1}O_2$, $Ir_xAu_{x-1}O_2$, $Ir_xTl_{x-1}O_2$, or $Ir_xBi_{x-1}O_2$, Further non-limiting examples of binary oxides of formula (I) may include $Ir_{0.25}Ag_{0.75}O_2$, $Ir_{0.5}Ag_{0.5}O_2$, $Ir_{0.75}Ag_{0.25}O_2$, $Ir_{0.25}Au_{0.75}O_2$, $Ir_{0.5}Au_{0.5}O_2$, $Ir_{0.75}Au_{0.25}O_2$, $Ir_{0.25}Ba_{0.75}O_2$, $Ir_{0.5}Ba_{0.5}O_2$, $Ir_{0.75}Ba_{0.25}O_2$, $Ir_{0.25}Bi_{0.75}O_2$, $Ir_{0.5}Bi_{0.5}O_2$, $Ir_{0.75}Bi_{0.25}O_2$, $Ir_{0.25}Ca_{0.75}O_2$, $Ir_{0.5}Ca_{0.5}O_2$, $Ir_{0.75}Ca_{0.25}O_2$, $Ir_{0.25}Ce_{0.75}O_2$, $Ir_{0.5}Ce_{0.5}O_2$, $Ir_{0.75}Ce_{0.25}O_2$, $Ir_{0.25}Eu_{0.75}O_2$, $Ir_{0.5}Eu_{0.5}O_2$, $Ir_{0.75}Eu_{0.25}O_2$, $Ir_{0.25}Ge_{0.75}O_2$, $Ir_{0.5}Ge_{0.5}O_2$, $Ir_{0.75}Ge_{0.25}O_2$, $Ir_{0.25}Hf_{0.75}O_2$, $Ir_{0.5}Hf_{0.5}O_2$, $Ir_{0.75}Hf_{0.25}O_2$, $Ir_{0.25}La_{0.75}O_2$, $Ir_{0.5}La_{0.5}O_2$, $Ir_{0.75}La_{0.25}O_2$, $Ir_{0.25}Nd_{0.75}O_2$, $Ir_{0.5}Nd_{0.5}O_2$, $Ir_{0.75}Nd_{0.25}O_2$, $Ir_{0.25}Os_{0.75}O_2$, $Ir_{0.5}OS_{0.5}O_2$, $Ir_{0.75}Os_{0.25}O_2$, $Ir_{0.25}Pd_{0.75}O_2$, $Ir_{0.5}Pd_{0.5}O_2$, $Ir_{0.75}Pd_{0.25}O_2$, $Ir_{0.25}Pr_{0.75}O_2$, $Ir_{0.5}Pr_{0.5}O_2$, $Ir_{0.75}Pr_{0.25}O_2$, $Ir_{0.25}Re_{0.75}O_2$, $Ir_{0.5}Re_{0.5}O_2$, $Ir_{0.75}Re_{0.25}O_2$, $Ir_{0.25}Rh_{0.75}O_2$, $Ir_{0.5}Rh_{0.5}O_2$, $Ir_{0.75}Rh_{0.25}O_2$, $Ir_{0.25}Sb_{0.75}O_2$, $Ir_{0.5}Sb_{0.52}$, $Ir_{0.75}Sb_{0.25}O_2$, $Ir_{0.25}Se_{0.75}O_2$, $Ir_{0.5}Se_{0.5}O_2$, $Ir_{0.75}Se_{0.25}O_2$, $Ir_{0.25}Sm_{0.75}O_2$, $Ir_{0.5}Sm_{0.5}O_2$, $Ir_{0.75}Sm_{0.25}O_2$, $Ir_{0.25}Sn_{0.75}O_2$, $Ir_{0.5}Sn_{0.5}O_2$, $Ir_{0.75}Sn_{0.25}O_2$, $Ir_{0.25}Tl_{0.75}O_2$, $Ir_{0.5}Tl_{0.5}O_2$, $Ir_{0.75}Tl_{0.25}O_2$, $Ir_{0.25}W_{0.75}O_2$, $Ir_{0.5}W_{0.5}O_2$, or $Ir_{0.75}W_{0.25}O_2$.

In one or more embodiments, another or second material may be disclosed. The material may be a ternary oxide. The material may be an OER catalyst material. The material may be a first, second, and/or third material. The material may include, comprise, consist essentially of, or consist of one or more compositions of formula (II):

$$Ir_xBi_yM_zO_2 \quad (II),$$

where x, y, z is each individually and independently any number between about 0.1 and 0.98, $x+y+z=1$, and M is an element from the Period 4, 5, or 6 of the Periodic Table of Elements.

In formula (II), x, y, and z may be each individually and independently about 0.1 and 0.99. x, y, and/or z may be about 0.1, 0.2, 0.3, 0.4, 0.5, 0.6, 0.7, 0.8, 0.9, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, or a range including any two of the disclosed numerals. A non-limiting example of the range for x, y, and/or z may be about 0.10-0.90, 0.20-0.80, or 0.30-0.70. Another non-limiting example of the range for x, y, and/or z may be about 0.25-0.5, 0.5-0.75, or 0.25-0.75.

In formula (II), at least the following condition may apply: $x+y+z=1$.

In formula (II), M may be an element from Period 4 of the Periodic Table of Elements and may include Ca, Ti, Ge; Period 5 of the Periodic Table of Elements and may include Y Zr, Nb, Mo, Rh, Pd, Ag, Sn, Sb; or Period 6 of the Periodic Table of Elements and may include Ba, La, Ce, Pr, Nd, Sm, Eu, Hf, Ta, W, Re, Os, Pt, Au, Tl, or Bi. In formula (I), M may be from Group IIA, IIIA, IVA, VA, VIA, IB, IIB, IIIB, IVB, VB, VIB, VIIB, or VIIIB. In formula (I), M may be an alkaline earth metal, coinage metal, volatile metal, icoasagen, tetrel, pentel, chalcogen, transition metal, port-transition metal, metalloid, nonmetal, or lanthanoid.

In formula (II), M may be an element from the Period 4 of the Periodic Table of Elements and may include Se, Period 4 of the Periodic Table of Elements and may include Sb, or Period 6 of the Periodic Table of Elements and may include Ce. In formula (II), M may be an element from Group VA, VIA, or IIIB. In formula (II), M may be a chalcanoid, metalloid, metal, lanthanoid, or nonmetal.

In formula (I), M may be an element selected from the group consisting of Ca, Ti, Ge, Y, Zr, Nb, Mo, Rh, Pd, Ag, Sn, Sb, Ba, La, Ce, Pr, Nd, Sm, Eu, Hf, Ta, W, Re, Os, Pt, Au, T, and Bi. In formula (II), M may be Se, Sb, or Ce. In formula (II), M may be selected from the group consisting of Se, Sb, and Ce.

Non-limiting example ternary oxides of formula (II) may include $Ir_{0.33}Bi_{0.33}Se_{0.33}O_2$, $Ir_{0.33}Bi_{0.33}Sn_{0.33}O_2$, $Ir_{0.33}Bi_{0.33}Sb_{0.33}O_2$, $Ir_{0.33}Bi_{0.33}Ce_{0.33}O_2$, $Ir_{0.25}Bi_{0.25}Se_{0.5}O_2$, $Ir_{0.25}Bi_{0.5}Se_{0.25}O_2$, $Ir_{0.5}Bi_{0.25}Se_{0.25}O_2$, $Ir_{0.25}Bi_{0.25}Sn_{0.5}O_2$, $Ir_{0.25}Bi_{0.5}Sn_{0.25}O_2$, $Ir_{0.5}Bi_{0.25}Sn_{0.25}O_2$, $Ir_{0.25}Bi_{0.25}Sb_{0.5}O_2$, $Ir_{0.25}Bi_{0.5}Sb_{0.25}O_2$, $Ir_{0.5}Bi_{0.25}Sb_{0.25}O_2$, $Ir_{0.25}Bi_{0.25}Ce_{0.5}O_2$, $Ir_{0.25}Bi_{0.5}Ce_{0.25}O_2$, or $Ir_{0.5}Bi_{0.25}Ce_{0.25}O_2$.

In one or more embodiments, the material of formula (I) may be combined with the material of formula (II). In one or more embodiments, a MEA may include one composition, at least one composition, or more than one composition of the material of formula (I) and one composition, at least one composition, or more than one composition of the material of formula (II).

One or more oxides of the formulas (I), (II), or both may form a protective, stabilizing, and/or active layer. The material of the formulas (I), (II), or both may form an internal layer, external layer, or both with respect to adjoining, adjacent, or integral bulk region. The bulk region may be an electrode. The electrode may be an anode, cathode, or both of a MEA, PEM electrolyzer, or PEMFC. The material and/or the layer including the material may form a catalyst or be part of a catalyst. The catalyst may be a part of a MEA, PEM electrolyzer, or PEMFC electrode. The material of the formula (I), (II), or both may be used as an OER catalyst in a MEA (e.g. MEA of a PEMFC or an electrolyzer MEA), an anode OER catalyst in a PEM electrolyzer, or as an additive or OER catalyst in a PEMFC anode. Alternatively, the material of formula (I), (II), or both may be used on a PEMFC cathode.

The material may be in a form of nanoparticles. The nanoparticles may have the same or different size, diameter, dimensions, orientation, structure, facets content, composition in each layer. The loading of the oxides of the formulas (I), (II), or both may be different or the same within the layer(s). It is contemplated that more than one layer including the oxides of the formulas (I), (II), or both may be formed. The layers may have the same or different architecture, loading of individual oxides, types of oxides, size of the oxide nanoparticles, the like, or a combination thereof.

Furthermore, variation of catalyst loading levels (e.g., gradient) may be used to lead to different OER activities and current density within the catalyst material/catalyst layer/electrode/cell/stack/MEA/electrolyzer/PEMFC. In other words, homogenization of the current density may be realized by tailoring the catalyst material/catalyst layer/electrode/cell/stack/MEA/electrolyzer/PEMFC by redistributing the catalyst loading.

The material of formula (I), (II), or both may be used in addition to traditional electrolyzer catalyst material(s) such as Ir, Ru, Ir—Ru, $IrO_2$, $RuO_2$, Ir—Ru—O. The material of the formula (I), (II), or both may replace a portion of the traditional electrolyzer catalyst material, especially toward the bulk region of the nanoparticles. For example, about 5 to 99, 10 to 80, or 20 to 70 wt. % of the traditional electrolyzer catalyst material may be replaced with the material of the formula (I), (II), or both. For example, about 5, 10, 15, 20, 25, 30, 35, 40, 45, 50, 55, 60, 65, 70, 75, 80, 85, 90, 95, 99, 100 wt. % of the traditional electrolyzer catalyst material may be replaced with the material of the formula (I), (II), or both. In a non-limiting specific example, an OER catalyst includes about 20 to 40 wt. % of Ir, Ru, Ir—Ru, $IrO_2$, $RuO_2$, Ir—Ru—O, or a combination thereof, and the remainder such as about 60 to 80 wt. % of the material of the formula (I), (II), or both.

The material of choice for the OER catalyst may be tailored to a specific application. For example, a more stable oxide of the formula (I), (II), or both may be placed within the MEA stack, electrolyzer stack, or PEMFC stack in the location requiring higher stability. Alternatively, or in addition, a more active oxide of the formula (I), (II), or both may be placed within the MEA stack, electrolyzer stack, or PEMFC stack in the location requiring higher activity. The MEA, electrolyzer, or PEMFC stack may thus be designed to maximize activity and stability by using different oxides of the formula (I), (II), or both in different locations.

For example, it was discovered that Bi-containing oxide of the formula (I), (II), or both is more stable than $IrO_2$. It was also discovered that Se-, Sb-, and Ce-containing oxides of the formula (I), (II), or both have increased activity in comparison to $IrO_2$. Thus, an electrolyzer or PEMFC cell and/or stack may include a first material including Bi-containing oxide of the formula (I), (II), or both to increase stability and/or a second material including Se-, Sb-, and Ce-containing oxides of the formula (I), (II), or both to increase activity. The first and second material may be used to partially or entirely replace a traditional MEA material/electrolyzer material/PEMFC electrode material, the third material, or be included together with the third material.

In the MEA, electrolyzer, and/or PEMFC region(s) that experience the least degradation, the performance and cost may be optimized by selecting the material of formula (I), (II), or both, structured to deliver the highest catalytic activity. In the non-limiting example, the region(s), cell(s), layer(s), catalyst(s), or a combination thereof may incorporate the material of formula (I), (II), or both including Se, Sn, Sb, Ce, Ti, Zr, Ta, W, Nb, Mo, Re, Ru, Os, or a combination thereof.

Similarly, the material of formula (I), (II), or both that are more stable may be utilized in the MEA, electrolyzer, and/or PEMFC region(s) that lead to a fast degradation. In a non-limiting example, the region(s), cell(s), layer(s), catalyst(s), may incorporate the material of formula (I), (II), or both including Bi, Y, La, Pr, Nd, Sm, Eu, Ag, Hf; Ba, Rh, Pd, Pt, Au, Tl, or a combination thereof.

Table 1 shows oxides of formulas (I) and (II) having higher stability, higher activity, and equal activity and stability with respect to $IrO_2$.

TABLE 1

| Reaction tendency of species in comparison to $IrO_2$ | |
|---|---|
| Higher stability than $IrO_2$ | Bi, Sm, La, Nd |
| Higher activity than $IrO_2$ | Ce, Se, Zr, Sb, Ti, Ta, W, Nb, Mo |
| Equal stability and activity as $IrO_2$ | Sn, Pr |

The material may be further arranged such that different MEA within a single stack include different disclosed species at various locations, depending on susceptibility to corrosion and desired performance (activity, stability). For example, a MEA stack may include a first material with one or more species of the material of formula (I), (II), or both in a number of first cell(s). A number of second cell(s), adjacent to the first cell(s), may include the disclosed material of formula (I), (II), or both with at least partially or completely different species/elements/M. A number of third cell(s) adjacent to the second cell(s) on the opposite side than the first cell(s) may include the material of formula (I), (II), or both with yet different species than the first and second cell(s). Alternatively, the second cell(s) may be adjacent to the first cell(s) on both sides. It is contemplated that various arrangements may be made within the MEA, PEM electrolyzer, PEMFC stack(s).

Figure 3:
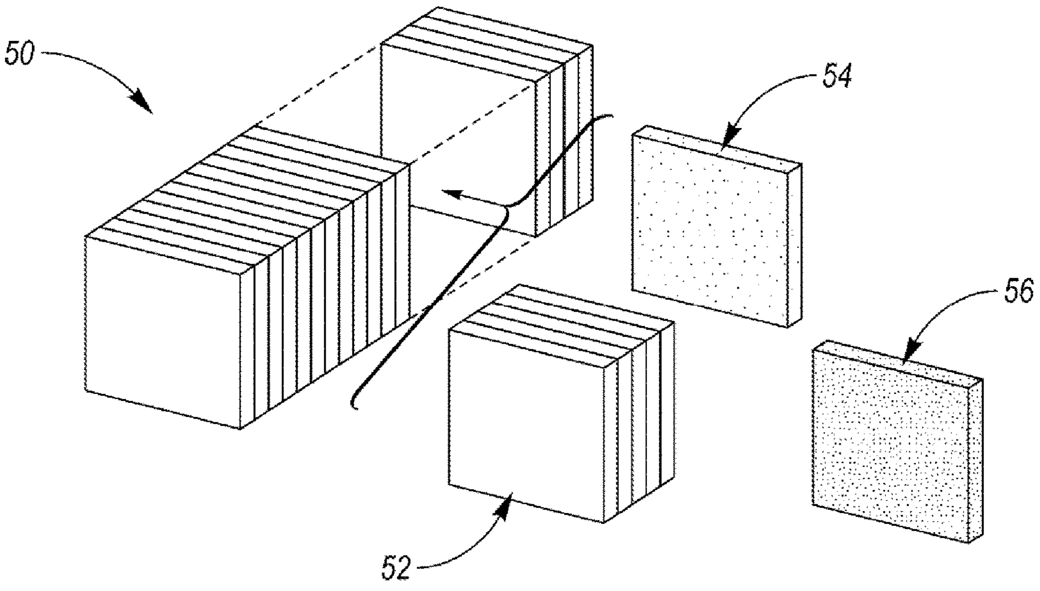
FIG. 3 shows a schematic of a MEA stack having individual cells tailored with the herein-disclosed material to achieve higher activity, stability, or both.

In a non-limiting example, shown in FIG. 3, a MEA stack 50 features first cells 52, second cells 54, and third cells 56. The first cells 52, the second cells 54, and the third cells 56 each have a different composition of the catalyst material of the formulas (I), (II), or both. For example, the second cell(s) 54 may include the material of formulas (I), (II), or both focused on increasing activity of the catalyst material/catalyst layer/electrode/cell/stack/MEA/electrolyzer/PEMFC, the third cell(s) 56 may include the material of formulas (I), (II), or both focused on increasing stability of the catalyst material/catalyst layer/electrode/cell/stack/

MEA, and the first cell(s) 52 may include the material of formula (I), (II), or both focused on sustainability, practicality, and lower production price of the catalyst material/catalyst layer/electrode/cell/stack/MEA, thus replacing a higher volume or traditional OER catalyst materials than the second and third cell(s) 54, 56.

The material of the formulas (I), (II), or both may be synthesized in the following manner. Metal containing precursors of the disclosed species may be annealed with desired stoichiometric amount in oxidizing (air or $O_2$) or reducing heat treatment condition using $N_2$, Ar, or $H_2$ mixture gas. The heat treatment temperature may range from about 150 to 1500° C. to yield a desired ternary oxides or doped composition. The heat treatment time may vary from about 30 seconds to 48 hrs. The metal precursors may be prepared by solid-state synthesis route (e.g., ball milling process), co-precipitation process (e.g., solution-based process), sol-gel process, hydrothermal process, or the like. The oxide specie(s) may be deposited on to a designated support materials (carbon, metal, ceramic, etc.) during the synthesis process or as a post-treatment step. Deposition techniques may include, but are not limited to, physical vapor deposition, chemical vapor deposition, atomic layer deposition, or solution-based approach, etc.

The electrode fabrication may include the following process. The oxide or the oxide on a support (see above) may be deposited on a membrane, a decal material, or a PTL with an ink containing additional ionomer and solvent(s) using typical deposition technique, followed by drying and/or annealing steps.

To reveal the structural and morphological details of the herein-disclosed oxide materials, X-ray diffraction (XRD) technique may be used to identify crystal structure. Different crystal structures may be found: e.g., cubic, tetragonal, trigonal, orthorhombic, monoclinic, etc. It may be possible to find other XRD peaks due to impurity and/or phase decomposition. For more accurate size distribution, high-resolution transmission electron microscope (HR-TEM) imaging technique may be used.

The above-mentioned material of the formulas (I) and (II) was identified using database-driven materials screening. While typically, a surface-based slab DFT model may be used to understand thermodynamic stability, metal mixing, element segregation toward surface or bulk, OER activity, and durability, both human and CPU times are quite expensive to build DFT slab models, carry out atomistic simulation, and analyze the results. Additionally, while the DFT slab models are ideal for a simple metal or a binary oxide system such as pure Ir, Ru, $IrO_2$, and $RuO_2$, even modeling binary metallic catalyst such as $Ir_xR_{1-x}$ becomes very complicated due to the increased degree of freedoms in structural generation. Instead, a different approach was adopted to identify suitable material to replace the traditional electrolyzer and PEMFC electrode materials. The approach is described below in the Experimental section.

Experimental Section

In the first step, $RuO_2$, $IrO_2$, and $PtO_2$ were examined against corrosive species H, $H_3O$, OH, OOH, O, and CO. Analysis of various reaction enthalpy $E_{rxn}$(eV/atom) values of the studied species in reducing and oxidizing reactions revealed tendencies of Ru and Ir compositions to lean more towards either higher activity or higher stability. For example, $RuO_2$ typically shows enhanced OER performance—i.e., more activity than $IrO_2$—but leads to poor stability due to corrosion from the strong acidity at the perfluorosulfonic membrane and high anodic potential at OER. On the other hand, $IrO_2$ is a more resistive material to OER in the acidic environment, but $IrO_2$ exhibits lower performance than $RuO_2$. Other Ir and Ru compositions were studied. Specific reaction parameters which reveal tendencies of materials to be more active (like $RuO_2$) or more stable (like $IrO_2$) were identified. The relevant reaction parameters were then studied with respect to 56 elements of the Periodic Table: Mg, Al, Si, Ca, Sc, Ti, V, Cr, Mn, Fe, Ni, Co, Cu, Zn, Ga, Ge, Se, Rb, Sr, Y, Zr, Nb, Mo, Ru, Rh, Pd, Ag, In, Sn, Sb, Te, Ba, La, Ce, Pr, Nd, Pm, Sm, Eu, Gd, Tb, Dy, Ho, Er, Tm, Yb, Lu, Hf, Ta, W, Re, Os, Pt, Au, Tl, and Bi.

The "interface reactions" module kit, publicly available from materialsproject.org was used. The decomposition products of $Ir_{0.75}M_{0.25}O_2$, where M represented each element named above, was conducted. The loading of Ir was chosen to be higher than loading of M. Because PEM electrolyzer operates in acidic conditions, the decomposition products of the studied material should be "acid stable." Decomposition products of each studied element were identified, and stable compositions determined. The $Ir_{0.75}M_{0.25}O_2$ compositions with stable decomposition products included M=Ca, Ti, Ge, Se, Y, Zr, Nb, Mo, Ru, Rh, Pd, Ag, Sn, Sb, Ba, La, Ce, Pr, Nd, Sm, Eu, Hf, Ta, W, Re, Os, Pt, Au, Tl, and Bi.

Next, the thermodynamic decomposition of $Ir_{0.75}Mo_{25}O_2$ at its given chemical space was studied. For example, $Ir_{0.75}Ru_{0.25}O_{0.2}$ tends to thermodynamically decompose to 0.75 $IrO_2$ and 0.25 $RuO_2$, where both oxides belong to a tetragonal crystal system ($P4_2$/mnm). But $Ir_{0.75}Pt_{0.25}O_2$ thermodynamically decomposes to 0.75 $IrO_2$ and 0.25 $PtO_2$. $PtO_2$ belongs to orthorhombic crystal system (Pnnm). Each phase mixture was examined to evaluate whether the decomposition products are tetragonal or non-tetragonal structures. Percentage of non-tetragonal phase in all phase mixtures was determined, and penalty points (PP) based on this value were assigned to non-tetragonal structures. Table 2 summarizes the thermodynamic decomposition reactions for $Ir_{0.75}M_{0.25}O_{0.2}$ and their assigned penalty points ($PP_{dcmp}$).

TABLE 2

Thermodynamic decomposition of $Ir_{0.75}M_{0.25}O_2$ products with penalty points assigned to non-tetragonal structures and acid stability

| M | Decomposition Reaction | $PP_{dcmp}$ | Acid Stability |
|---|---|---|---|
| Ca | $Ca_{0.25}Ir_{0.75}O_2 \rightarrow 0.25\ IrO_3 + 0.25\ CaIrO_3 + 0.25\ IrO_2$ | 0.667 | Maybe ($Ca^{2+}$ unstable) |
| Ti | $Ti_{0.25}Ir_{0.75}O_2 \rightarrow 0.25\ TiO_2 + 0.75\ IrO_2$ | 0.000 | Passivates ($TiO_2$) |
| Ge | $Ge_{0.25}Ir_{0.75}O_2 \rightarrow 0.25\ GeO_2 + 0.75\ IrO_2$ | 0.250 | Stable |
| Se | $Ir_{0.75}Se_{0.25}O_2 \rightarrow 0.75\ IrO_2 + 0.25\ SeO_2$ | 0.000 | Passivates ($SeO_2$) |
| Y | $Y_{0.25}Ir_{0.75}O_2 \rightarrow 0.125\ IrO_3 + 0.125\ Y_2Ir_2O_7 + 0.375\ IrO_2$ | 0.400 | Maybe ($Y^{3+}$ unstable) |
| Zr | $Zr_{0.25}Ir_{0.75}O_2 \rightarrow 0.25\ ZrO_2 + 0.75\ IrO_2$ | 0.250 | Passivates ($ZrO_2$) |
| Nb | $Nb_{0.25}Ir_{0.75}O_2 \rightarrow 0.125\ Nb_2O_5 + 0.062\ Ir + 0.688\ IrO_2$ | 0.214 | Passivates ($NbO_x$) |
| Mo | $Mo_{0.25}Ir_{0.75}O_2 \rightarrow 0.25\ MoO_2 + 0.75\ IrO_2$ | 0.000 | Passivates ($MoO_x$) |

TABLE 2-continued

Thermodynamic decomposition of $Ir_{0.75}M_{0.25}O_2$ products with penalty points assigned to non-tetragonal structures and acid stability

| M | Decomposition Reaction | $PP_{dcmp}$ | Acid Stability |
|---|---|---|---|
| Ru | $Ir_{0.75}Ru_{0.25}O_2 \rightarrow 0.75\ IrO_2 + 0.25\ RuO_2$ | 0.000 | Noble Metal (immune) |
| Rh | $Ir_{0.75}Rh_{0.25}O_2 \rightarrow 0.75\ IrO_2 + 0.25\ RhO_2$ | 0.000 | Noble Metal (immune) |
| Pd | $Ir_{0.75}Pd_{0.25}O_2 \rightarrow 0.25\ PdO_2 + 0.75\ IrO_2$ | 0.000 | Noble Metal (immune) |
| Ag | $Ag_{0.25}Ir_{0.75}O_2 \rightarrow 0.083\ Ag_3O_4 + 0.167\ IrO_3 + 0.583\ IrO_2$ | 0.300 | Noble Metal (immune) |
| Sn | $Sn_{0.25}Ir_{0.75}O_2 \rightarrow 0.25\ SnO_2 + 0.75\ IrO_2$ | 0.000 | Passivates ($SnO_2$) |
| Sb | $Sb_{0.25}Ir_{0.75}O_2 \rightarrow 0.25\ SbO_2 + 0.75\ IrO_2$ | 0.250 | Passivates ($SbO_x$) |
| Ba | $Ba_{0.25}Ir_{0.75}O_2 \rightarrow 0.25\ Ba(IrO_3)_2 + 0.25\ IrO_2$ | 0.500 | Maybe ($Ba^{2+}$ unstable) |
| La | $La_{0.25}Ir_{0.75}O_2 \rightarrow 0.083\ La_3Ir_3O_{11} + 0.083\ IrO_3 + 0.417\ IrO_2$ | 0.285 | Maybe ($La^{3+}$ unstable) |
| Ce | $Ce_{0.25}Ir_{0.75}O_2 \rightarrow 0.25\ CeO_2 + 0.75\ IrO_2$ | 0.250 | Passivates ($CeO_2$) |
| Pr | $Pr_{0.25}Ir_{0.75}O_2 \rightarrow 0.083\ Pr_3IrO_7 + 0.083\ IrO_3 + 0.583\ IrO_2$ | 0.222 | Maybe ($Pr^{3+}$ unstable) |
| Nd | $Nd_{0.25}Ir_{0.75}O_2 \rightarrow 0.083\ Nd_3IrO_7 + 0.083\ IrO_3 + 0.583\ IrO_2$ | 0.222 | Maybe ($Nd^{3+}$ unstable) |
| Sm | $Sm_{0.25}Ir_{0.75}O_2 \rightarrow 0.083\ IrO_3 + 0.083\ Sm_3IrO_7 + 0.583\ IrO_2$ | 0.222 | Maybe ($Sm^{3+}$ unstable |
| Eu | $Eu_{0.25}Ir_{0.75}O_2 \rightarrow 0.125\ IrO_3 + 0.125\ Eu_2Ir_2O_7 + 0.375\ IrO_2$ | 0.400 | Maybe $Eu^{3+}$ unstable) |
| Hf | $Hf_{0.25}Ir_{0.75}O_2 \rightarrow 0.25\ HfO_2 + 0.75\ IrO_2$ | 0.250 | Passivates ($HfO_2$) |
| Ta | $Ta_{0.25}Ir_{0.75}O_2 \rightarrow 0.125\ Ta_2O_5 + 0.062\ Ir + 0.688\ IrO_2$ | 0.143 | Passivates ($Ta_2O_5$) |
| W | $Ir_{0.75}W_{0.25}O_2 \rightarrow 0.25\ WO_3 + 0.625\ IrO_2 + 0.125\ Ir$ | 0.000 | Passivates ($WO_3$) |
| Re | $Re_{0.25}Ir_{0.75}O_2 \rightarrow 0.25\ ReO_3 + 0.125\ Ir + 0.625\ IrO_2$ | 0.250 | Passivates ($ReO_2$) |
| Os | $Ir_{0.75}Os_{0.25}O_2 \rightarrow 0.75\ IrO_2 + 0.25\ OsO_2$ | 0.250 | Passivates ($OsO_x$) |
| Pt | $Ir_{0.75}Pt_{0.25}O_2 \rightarrow 0.25\ PtO_2 + 0.75\ IrO_2$ | 0.250 | Noble Metal (immune) |
| Au | $Ir_{0.75}Au_{0.25}O_2 \rightarrow 0.125\ IrO_3 + 0.625\ IrO_2 + 0.125\ Au_2O_3$ | 0.375 | Noble Metal (immune) |
| Tl | $Tl_{0.25}Ir_{0.75}O_2 \rightarrow 0.125\ IrO_3 + 0.125\ Tl_2O_3 + 0.625\ IrO_2$ | 0.286 | Passivates ($Tl_2O_3$) |
| Bi | $Bi_{0.25}Ir_{0.75}O_2 \rightarrow 0.083\ Bi_3Ir_3O_{11} + 0.083\ IrO_3 + 0.417\ IrO_2$ | 0.285 | Passivates ($BiO_x$) |

Generally, noble metals are immune in the acidic region, and there are metals that passivate (e.g., $TiO_2$) which are also stable in the acidic regions. Some metals that are known to be not stable in the acid (e.g., Ca) when decomposition product is not a pure metal or a binary oxide but forms a ternary oxide (e.g., $CaIrO_3$) were included.

Further analysis included testing of chemical reactivity of each oxide system in oxidizing conditions (against OH, OOH, 0), reducing conditions (against H and $H_3O$), and CO poisoning or carbon corrosion at high potential: $CO+H_2O \rightarrow H_2+CO_2$.

Figure 4:
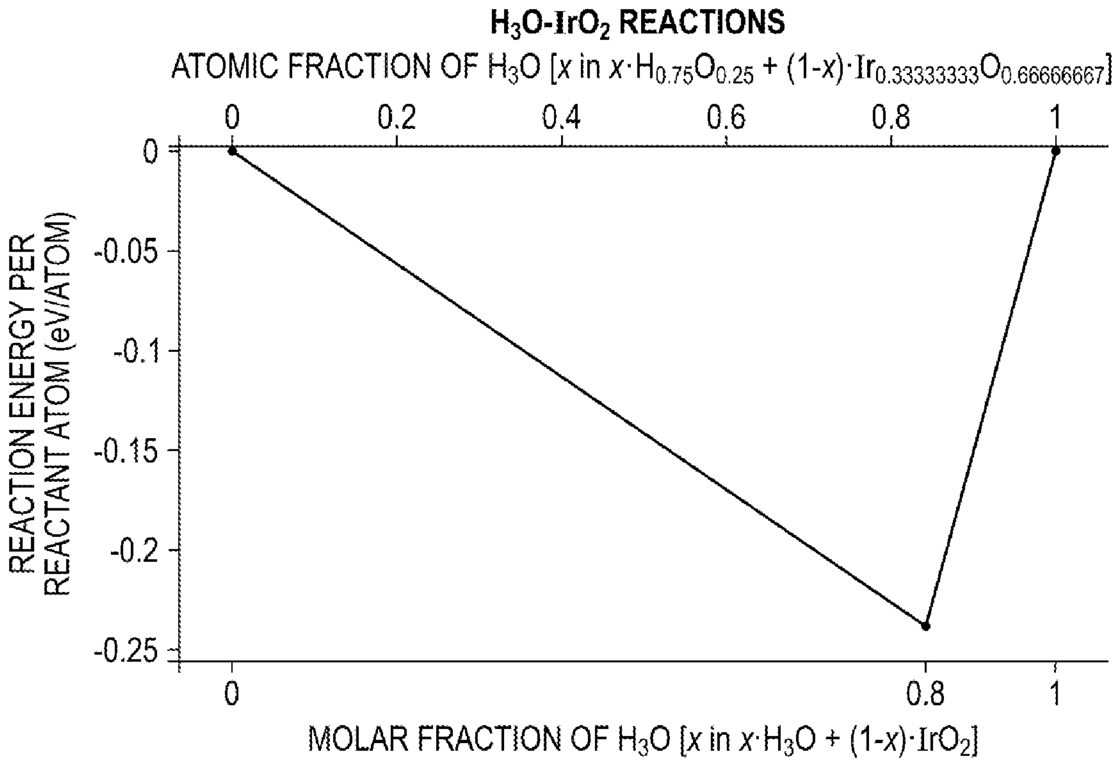
FIG. 4 shows a phase diagram between $H_3O$ and $IrO_2$.

For studying these reactions, each ternary oxide was tested during the most thermodynamically stable reaction pathway (i.e., at its minimum reaction enthalpy in 2D phase space between ternary oxide catalyst phase and H, $H_3O$, OH, OOH, O, and CO). $IrO_2$ catalyst was chosen as a reference material to evaluate each $Ir_{0.75}M_{0.25}O_2$ phase. A phase diagram between $H_3O$ (representative oxidizing agent: $H_2O+H$) and $IrO_2$ PEM electrolyzer catalyst was generated. The phase diagram is shown in FIG. 4, where the molar fraction (x) indicates the amount of $H_3O$ and $IrO_2$. For example, x=0 represents pure $IrO_2$, and x=1 represents 100% $H_3O$. The most stable reaction between two species takes place at its minimum reaction enthalpy Ern. As can be seen in FIG. 4, the strongest decomposition reaction occurs at molar fraction x=0.8, where $0.8H_3O$ and $0.2IrO_2$ react to form 0.2 Ir and 1.2 $H_2O$ as decomposition products. The reaction enthalpy ($E_{Rxn}$) between $H_3O$ and $IrO_2$ is −0.238 eV/atom.

The most thermodynamically stable reaction (at minimum $E_{rxn}$) for each studied $Ir_{0.75}M_{0.25}O_2$ ternary oxide catalyst phase was determined and compared to $IrO_2$. Evaluating such reactions against H, $H_3O$, OH, OOH, O, and CO (also called the PEM electrolyzer species) accounts for situations, where both PEM electrolyzer species and potential catalyst materials are abundantly present, where decomposition reactions may proceed at the minimum reaction enthalpy (i.e., the most favorable condition). By evaluating these reactions, the following information was obtained: (1) the amount of species (H, $H_3O$, OH, OOH, O, and CO) each ternary oxide catalyst is capable of consuming at its thermodynamic equilibrium and (2) how favorable is the most stable decomposition reaction (i.e., what is the magnitude of $E_{rxn,min}$).

Tables 3 and 4 summarize the H and $H_3O$ reactions respectively for $Ir_{0.75}M_{0.25}O_2$. For Tables 3 and 4, when molar ratio is different between H/oxide, normalization to H/oxide of $IrO_2$, which is 2, was made. For example, $Ba_{0.25}Ir_{0.75}O_2$ in Table 3 shows lower H/oxide value (1.75) when compared to $IrO_2$. Normalization of H/oxide=2 for $Ba_{0.25}Ir_{0.75}O_2$ further increases the $E_{rxn}$ to a higher value. A higher H or $H_3O$/oxide ratio indicates that an OER catalyst can take more PEM electrolyzer species per mol. It was discovered that in the reducing conditions, a lower H or $H_3O$/oxide ratio and increased $E_{rxn,H}$ values indicate more active OER catalyst ($RuO_2$-like) and a higher H or $H_3O$/oxide ratio and lower $E_{rxn,H}$ values indicate more stable OER catalyst ($IrO_2$-like).

TABLE 3

Chemical reactivity of $Ir_{0.75}M_{0.25}O_2$ against H

| Ref. | $H_2$ Reaction for $IrO_2$ | H/oxide | $E_{rxn,H}$ |
|---|---|---|---|
| $IrO_2$ | $0.4\ H_2 + 0.2\ IrO_2 \rightarrow 0.2\ Ir + 0.4\ H_2O$ | 2.00 | −0.646 |
| M | $H_2$ Reaction for $Ir_{0.75}M_{0.25}O_2$ | H/oxide | $E_{rxn,H}$ |
| Ca | $0.389\ H_2 + 0.222\ Ca_{0.25}Ir_{0.75}O_2 \rightarrow 0.056\ Ca(HO)_2 + 0.333\ H_2O + 0.167\ Ir$ | 1.75 | −0.685 |
| Ti | $0.375\ H_2 + 0.25\ Ti_{0.25}Ir_{0.75}O_2 \rightarrow 0.375\ H_2O + 0.063\ TiO_2 + 0.188\ Ir$ | 1.50 | −0.565 |
| Ge | $0.375\ H_2 + 0.25\ Ge_{0.25}Ir_{0.75}O_2 \rightarrow 0.062\ GeO_2 + 0.375\ H_2O + 0.187\ Ir$ | 1.50 | −0.565 |

TABLE 3-continued

| Chemical reactivity of $Ir_{0.75}M_{0.25}O_2$ against H | | | |
|---|---|---|---|
| Se | $0.4\ H_2 + 0.2\ Ir_{0.75}Se_{0.25}O_2 \rightarrow 0.025\ IrSe_2 + 0.4\ H_2O + 0.125\ Ir$ | 2.00 | −0.675 |
| Y | $0.3825\ H_2 + 0.235\ Y_{0.25}Ir_{0.75}O_2 \rightarrow 0.059\ YHO_2 + 0.353\ H_2O + 0.176\ Ir$ | 1.63 | −0.621 |
| Zr | $0.375\ H_2 + 0.25\ Zr_{0.25}Ir_{0.75}O_2 \rightarrow 0.375\ H_2O + 0.063\ ZrO_2 + 0.188\ Ir$ | 1.50 | −0.565 |
| Nb | $0.368\ H_2 + 0.264\ Nb_{0.25}Ir_{0.75}O_2 \rightarrow 0.368\ H_2O + 0.005\ Nb_{12}O_{29} + 0.198\ Ir$ | 1.39 | −0.541 |
| Mo | $0.4\ H_2 + 0.2\ Mo_{0.25}Ir_{0.75}O_2 \rightarrow 0.4\ H_2O + 0.05\ MoIr_3$ | 2.00 | −0.602 |
| Ru | $0.4\ H_2 + 0.2\ Ir_{0.75}Ru_{0.25}O_2 \rightarrow 0.05\ Ir_3Ru + 0.4\ H_2O$ | 2.00 | −0.631 |
| Rh | $0.4\ H_2 + 0.2\ Ir_{0.75}Rh_{0.25}O_2 \rightarrow 0.05\ Ir_3Rh + 0.4\ H_2O$ | 2.00 | −0.653 |
| Pd | $0.4\ H_2 + 0.2\ Ir_{0.75}Pd_{0.25}O_2 \rightarrow 0.4\ H_2O + 0.05\ Pd + 0.15\ Ir$ | 2.00 | −0.703 |
| Ag | $0.4\ H_2 + 0.2\ Ag_{0.25}Ir_{0.75}O_2 \rightarrow 0.4\ H_2O + 0.05\ Ag + 0.15\ Ir$ | 2.00 | −0.743 |
| Sn | $0.4\ H_2 + 0.2\ Sn_{0.25}Ir_{0.75}O_2 \rightarrow 0.4\ H_2O + 0.05\ SnIr + 0.1\ Ir$ | 2.00 | −0.572 |
| Sb | $0.2\ Sb_{0.25}Ir_{0.75}O_2 + 0.4\ H_2 \rightarrow 0.025\ Sb_2Ir + 0.4\ H_2O + 0.125\ Ir$ | 2.00 | −0.604 |
| Ba | $0.389\ H_2 + 0.222\ Ba_{0.25}Ir_{0.75}O_2 \rightarrow 0.056\ BaH_8O_5 + 0.167\ H_2O + 0.167\ Ir$ | 1.75 | −0.634 |
| La | $0.3825\ H_2 + 0.235\ La_{0.25}Ir_{0.75}O_2 \rightarrow 0.059\ La(HO)_3 + 0.294\ H_2O + 0.176\ Ir$ | 1.63 | −0.615 |
| Ce | $0.375\ H_2 + 0.25\ Ce_{0.25}Ir_{0.75}O_2 \rightarrow 0.062\ CeO_2 + 0.375\ H_2O + 0.187\ Ir$ | 1.50 | −0.565 |
| Pr | $0.235\ Pr_{0.25}Ir_{0.75}O_2 + 0.3825\ H_2 \rightarrow 0.059\ Pr(HO)_3 + 0.294\ H_2O + 0.176\ Ir$ | 1.63 | −0.625 |
| Nd | $0.3825\ H_2 + 0.235\ Nd_{0.25}Ir_{0.75}O_2 \rightarrow 0.059\ Nd(HO)_3 + 0.294\ H_2O + 0.176\ Ir$ | 1.63 | −0.624 |
| Sm | $0.3825\ H_2 + 0.235\ Sm_{0.25}Ir_{0.75}O_2 \rightarrow 0.059\ Sm(HO)_3 + 0.294\ H_2O + 0.176\ Ir$ | 1.63 | −0.621 |
| Eu | $0.3845\ H_2 + 0.231\ Eu_{0.25}Ir_{0.75}O_2 \rightarrow 0.019\ Eu_3O_4 + 0.385\ H_2O + 0.173\ Ir$ | 1.66 | −0.607 |
| Hf | $0.375\ H_2 + 0.25\ Hf_{0.25}Ir_{0.75}O_2 \rightarrow 0.375\ H_2O + 0.063\ HfO_2 + 0.188\ Ir$ | 1.50 | −0.565 |
| Ta | $0.3665\ H_2 + 0.267\ Ta_{0.25}Ir_{0.75}O_2 \rightarrow 0.367\ H_2O + 0.033\ Ta_2O_5 + 0.2\ Ir$ | 1.37 | −0.540 |
| W | $0.4\ H_2 + 0.2\ Ir_{0.75}W_{0.25}O_2 \rightarrow 0.05\ Ir_3W + 0.4\ H_2O$ | 2.00 | −0.591 |
| Re | $0.2\ Re_{0.25}Ir_{0.75}O_2 + 0.4\ H_2 \rightarrow 0.05\ ReIr_3 + 0.4\ H_2O$ | 2.00 | −0.565 |
| Os | $0.4\ H_2 + 0.2\ Ir_{0.75}Os_{0.25}O_2 \rightarrow 0.4\ H_2O + 0.05\ Os + 0.15\ Ir$ | 2.00 | −0.637 |
| Pt | $0.4\ H_2 + 0.2\ Ir_{0.75}Pt_{0.25}O_2 \rightarrow 0.4\ H_2O + 0.05\ Pt + 0.15\ Ir$ | 2.00 | −0.681 |
| Au | $0.4\ H_2 + 0.2\ Ir_{0.75}Au_{0.25}O_2 \rightarrow 0.4\ H_2O + 0.05\ Au + 0.15\ Ir$ | 2.00 | −0.737 |
| Tl | $0.4\ H_2 + 0.2\ Tl_{0.25}Ir_{0.75}O_2 \rightarrow 0.4\ H_2O + 0.05\ Tl + 0.15\ Ir$ | 2.00 | −0.679 |
| Bi | $0.2\ Bi_{0.25}Ir_{0.75}O_2 + 0.4\ H_2 \rightarrow 0.4\ H_2O + 0.025\ Bi_2Ir + 0.125\ Ir$ | 2.00 | −0.623 |

TABLE 4

| Chemical reactivity of $Ir_{0.75}M_{0.25}O_2$ against $H_3O$ | | | |
|---|---|---|---|
| Ref. | $H_3O$ Reaction for $IrO_2$ | Ratio | $E_{rxn,\ H3O}$ |
| $IrO_2$ | $0.8\ H_3O + 0.2\ IrO_2 \rightarrow 0.2\ Ir + 1.2\ H_2O$ | 4.00 | −0.238 |
| M | $H_3O$ Reaction for $Ir_{0.75}M_{0.25}O_2$ | Ratio | $E_{rxn,\ H3O}$ |
| Ca | $0.778\ H_3O + 0.222\ Ca_{0.25}Ir_{0.75}O_2 \rightarrow 0.056\ Ca(HO)_2 + 1.111\ H_2O + 0.167\ Ir$ | 3.50 | −0.262 |
| Ti | $0.75\ H_3O + 0.25\ Ti_{0.25}Ir_{0.75}O_2 \rightarrow 1.125\ H_2O + 0.063\ TiO_2 + 0.187\ Ir$ | 3.00 | −0.226 |
| Ge | $0.75\ H_3O + 0.25\ Ge_{0.25}Ir_{0.75}O_2 \rightarrow 0.063\ GeO_2 + 1.125\ H_2O + 0.188\ Ir$ | 3.00 | −0.226 |
| Se | $0.8\ H_3O + 0.2\ Ir_{0.75}Se_{0.25}O_2 \rightarrow 0.025\ IrSe_2 + 1.2\ H_2O + 0.125\ Ir$ | 4.00 | −0.249 |
| Y | $0.765\ H_3O + 0.235\ Y_{0.25}Ir_{0.75}O_2 \rightarrow 0.059\ YHO_2 + 1.118\ H_2O + 0.176\ Ir$ | 3.26 | −0.243 |
| Zr | $0.75\ H_3O + 0.25\ Zr_{0.25}Ir0.75O_2 \rightarrow 1.125\ H_2O + 0.063\ ZrO_2 + 0.187\ Ir$ | 3.00 | −0.226 |
| Nb | $0.733\ H_3O + 0.267\ Nb_{0.25}Ir_{0.75}O_2 \rightarrow 0.033\ Nb_2O_5 + 1.1\ H_2O + 0.2\ Ir$ | 2.75 | −0.222 |
| Mo | $0.75\ H_3O + 0.25\ Mo_{0.25}Ir_{0.75}O_2 \rightarrow 1.125\ H_2O + 0.063\ MoO_2 + 0.187\ Ir$ | 3.00 | −0.226 |
| Ru | $0.8\ H_3O + 0.2\ Ir_{0.75}Ru_{0.25}O_2 \rightarrow 0.05\ Ir_3Ru + 1.2\ H_2O$ | 4.00 | −0.233 |
| Rh | $0.8\ H_3O + 0.2\ Ir_{0.75}Rh_{0.25}O_2 \rightarrow 0.05\ Ir_3Rh + 1.2\ H_2O$ | 4.00 | −0.241 |
| Pd | $0.8\ H_3O + 0.2\ Ir_{0.75}Pd_{0.25}O_2 \rightarrow 1.2\ H_2O + 0.05\ Pd + 0.15\ Ir$ | 4.00 | −0.259 |
| Ag | $0.8\ H_3O + 0.2\ Ag_{0.25}Ir_{0.75}O_2 \rightarrow 1.2\ H_2O + 0.05\ Ag + 0.15\ Ir$ | 4.00 | −0.274 |
| Sn | $0.75\ H_3O + 0.25\ Sn_{0.25}Ir_{0.75}O_2 \rightarrow 0.063\ SnO_2 + 1.125\ H_2O + 0.188\ Ir$ | 3.00 | −0.226 |
| Sb | $0.235\ Sb_{0.25}Ir_{0.75}O_2 + 0.765\ H_3O \rightarrow 0.029\ Sb_2O_3 + 1.147\ H_2O + 0.176\ Ir$ | 3.26 | −0.227 |
| Ba | $0.778\ H_3O + 0.222\ Ba_{0.25}Ir_{0.75}O_2 \rightarrow 0.056\ BaH_8O_5 + 0.944\ H_2O + 0.167\ Ir$ | 3.50 | −0.243 |
| La | $0.765\ H_3O + 0.235\ La_{0.25}Ir_{0.75}O_2 \rightarrow 0.059\ La(HO)_3 + 1.059\ H_2O + 0.176\ Ir$ | 3.26 | −0.240 |
| Ce | $0.75\ H_3O + 0.25\ Ce_{0.25}Ir_{0.75}O_2 \rightarrow 0.063\ CeO_2 + 1.125\ H_2O + 0.188\ Ir$ | 3.00 | −0.226 |
| Pr | $0.235\ Pr_{0.25}Ir_{0.75}O_2 + 0.765\ H_3O \rightarrow 0.059\ Pr(HO)_3 + 1.059\ H_2O + 0.176\ Ir$ | 3.26 | −0.244 |
| Nd | $0.765\ H_3O + 0.235\ Nd_{0.25}Ir_{0.75}O_2 \rightarrow 0.059\ Nd(HO)_3 + 1.059\ H_2O + 0.176\ Ir$ | 3.26 | −0.244 |
| Sm | $0.765\ H_3O + 0.235\ Sm_{0.25}Ir_{0.75}O_2 \rightarrow 0.059\ Sm(HO)_3 + 1.059\ H_2O + 0.176\ Ir$ | 3.26 | −0.243 |
| Eu | $0.765\ H_3O + 0.235\ Eu_{0.25}Ir_{0.75}O_2 \rightarrow 0.029\ Eu_2O_3 + 1.147\ H_2O + 0.176\ Ir$ | 3.26 | −0.236 |
| Hf | $0.75\ H_3O + 0.25\ Hf_{0.25}Ir_{0.75}O_2 \rightarrow 1.125\ H_2O + 0.063\ HfO_2 + 0.187\ Ir$ | 3.00 | −0.226 |
| Ta | $0.733\ H_3O + 0.267\ Ta_{0.25}Ir_{0.75}O_2 \rightarrow 1.1\ H_2O + 0.033\ Ta_2O_5 + 0.2\ Ir$ | 2.75 | −0.222 |
| W | $0.8\ H_3O + 0.2\ Ir_{0.75}W_{0.25}O_2 \rightarrow 0.05\ Ir_3W + 1.2\ H_2O$ | 4.00 | −0.218 |
| Re | $0.286\ Re_{0.25}Ir_{0.75}O_2 + 0.714\ H_3O \rightarrow 0.071\ ReO_3 + 1.071\ H_2O + 0.214\ Ir$ | 2.50 | −0.217 |
| Os | $0.8\ H_3O + 0.2\ Ir_{0.75}Os_{0.25}O_2 \rightarrow 1.2\ H_2O + 0.05\ Os + 0.15\ Ir$ | 4.00 | −0.235 |
| Pt | $0.8\ H_3O + 0.2\ Ir_{0.75}Pt_{0.25}O_2 \rightarrow 1.2\ H_2O + 0.05\ Pt + 0.15\ Ir$ | 4.00 | −0.251 |
| Au | $0.8\ H_3O + 0.2\ Ir_{0.75}Au_{0.25}O_2 \rightarrow 1.2\ H_2O + 0.05\ Au + 0.15\ Ir$ | 4.00 | −0.272 |
| Tl | $0.789\ H_3O + 0.211\ Tl_{0.25}Ir_{0.75}O_2 \rightarrow 0.026\ Tl_2O + 1.184\ H_2O + 0.158\ Ir$ | 3.74 | −0.253 |
| Bi | $0.235\ Bi_{0.25}Ir_{0.75}O_2 + 0.765\ H_3O \rightarrow 0.029\ Bi_2O_3 + 1.147\ H_2O + 0.176\ Ir$ | 3.26 | −0.239 |

Tables 5, 6, and 7 summarize Ir-M-O chemical reactivity with OH, OOH, and O at its most stable thermodynamic reaction between the OER catalyst and the PEM electrolyzer species. In Tables 5, 6, and 7, when molar ratio is different between the oxidizing agent and the catalyst, normalization to 2 was made. For example, the ratio between OH and $IrO_2$ in Table 5 is 2—i.e., 0.667 OH (or, 0.333 $H_2O_2$) per 0.333 $IrO_2$. $Ir_{0.75}NB_{0.25}O_2$ in Table 5 shows lower OH/oxide value (1.75) when compared to $IrO_2$. Normalization of OH/oxide to 2 for $Ir_{0.75}Nb_{0.25}O_2$ increases the $E_{rxn}$ to become a higher value. A higher OH, OOH, or O/oxide ratio indicates that an OER catalyst can take more PEM electrolyzer species per mol. In the oxidizing conditions, the goal was to identify a higher amount of OH, OOH, or O per oxide, meaning, the OER catalyst is capable of absorbing more PEM electrolyzer species per mol. It was discovered that in the oxidizing conditions, a higher OH, OOH, or O/oxide ratio and lower $E_{rxn,H}$ values indicate more active OER catalyst ($RuO_2$-like) and a lower OH, OOH, or O/oxide ratio and higher $E_{rxn,H}$ values indicate more stable OER catalyst ($IrO_2$-like).

TABLE 5

Chemical reactivity of $Ir_{0.75}M_{0.25}O_2$ against OH

| Ref. | OH Reaction for $IrO_2$ | Ratio | $E_{rxn,\ OH}$ |
|---|---|---|---|
| $IrO_2$ | $0.333 H_2O_2 + 0.333 IrO_2 \rightarrow 0.333 IrO_3 + 0.333 H_2O$ | 2.00 | −0.070 |
| M | OH Reaction for $Ir_{0.75}M_{0.25}O_2$ | Ratio | $E_{rxn,\ OH}$ |
| Ca | $0.25 H_2O_2 + 0.5 Ca_{0.25}Ir_{0.75}O_2 \rightarrow 0.375 IrO_3 + 0.125 Ca(HO)_2 + 0.125 H_2O$ | 1.00 | −0.062 |
| Ti | $0.3 H_2O_2 + 0.4 Ti_{0.25}Ir_{0.75}O_2 \rightarrow 0.3 IrO_3 + 0.3 H_2O + 0.1 TiO_2$ | 1.50 | −0.061 |
| Ge | $0.3 H_2O_2 + 0.4 Ge_{0.25}Ir_{0.75}O_2 \rightarrow 0.3 IrO_3 + 0.1 GeO_2 + 0.3 H_2O$ | 1.50 | −0.061 |
| Se | $0.357 H_2O_2 + 0.286 Ir_{0.75}Se_{0.25}O_2 \rightarrow 0.071 H_{10}SeO_8 + 0.214 IrO_3 + 0.036 O_2$ | 2.50 | −0.086 |
| Y | $0.278 H_2O_2 + 0.444 Y_{0.25}Ir_{0.75}O_2 \rightarrow 0.333 IrO_3 + 0.111 YHO_2 + 0.222 H_2O$ | 1.25 | −0.055 |
| Zr | $0.429 H_2O_2 + 0.571 Zr_{0.25}Ir_{0.75}O_2 \rightarrow 0.429 IrO_3 + 0.429 H_2O + 0.143 ZrO_2$ | 1.50 | −0.061 |
| Nb | $0.318 H_2O_2 + 0.364 Nb_{0.25}Ir_{0.75}O_2 \rightarrow 0.273 IrO_3 + 0.045 Nb_2O_5 + 0.318 H_2O$ | 1.75 | −0.100 |
| Mo | $0.1665 H_2O_2 + 0.667 Mo_{0.25}Ir_{0.75}O_2 \rightarrow 0.167 MoO_3 + 0.167 H_2O + 0.5 IrO_2$ | 0.50 | −0.124 |
| Ru | $0.556 H_2O_2 + 0.444 Ir_{0.75}Ru_{0.25}O_2 \rightarrow 0.333 IrO_3 + 0.111 RuO_4 + 0.556 H_2O$ | 2.505 | −0.115 |
| Rh | $0.3 H_2O_2 + 0.4 Ir_{0.75}Rh_{0.25}O_2 \rightarrow 0.3 IrO_3 + 0.3 H_2O + 0.1 RhO_2$ | 1.50 | −0.061 |
| Pd | $0.3 H_2O_2 + 0.4 Ir_{0.75}Pd_{0.25}O_2 \rightarrow 0.3 IrO_3 + 0.1 PdO_2 + 0.3 H_2O$ | 1.50 | −0.061 |
| Ag | $0.385 H_2O_2 + 0.615 Ag_{0.25}Ir_{0.75}O_2 \rightarrow 0.154 AgHO_2 + 0.462 IrO_3 + 0.308 H_2O$ | 1.25 | −0.057 |
| Sn | $0.3 H_2O_2 + 0.4 Sn_{0.25}Ir_{0.75}O_2 \rightarrow 0.3 IrO_3 + 0.1 SnO_2 + 0.3 H_2O$ | 1.50 | −0.061 |
| Sb | $0.364 Sb_{0.25}Ir_{0.75}O_2 + 0.318 H_2O_2 \rightarrow 0.273 IrO_3 + 0.045 Sb_2O_5 + 0.318 H_2O$ | 1.75 | −0.086 |
| Ba | $0.1665 H_2O_2 + 0.667 Ba_{0.25}Ir_{0.75}O_2 \rightarrow 0.167 Ba(IrO_3)_2 + 0.167 IrO_3 + 0.167 H_2O$ | 0.50 | −0.031 |
| La | $0.269 H_2O_2 + 0.462 La_{0.25}Ir_{0.75}O_2 \rightarrow 0.308 IrO_3 + 0.038 La_3IrO_7 + 0.269 H_2O$ | 1.16 | −0.050 |
| Ce | $0.429 H_2O_2 + 0.571 Ce_{0.25}Ir_{0.75}O_2 \rightarrow 0.429 IrO_3 + 0.143 CeO_2 + 0.429 H_2O$ | 1.50 | −0.061 |
| Pr | $0.444 Pr_{0.25}Ir_{0.75}O_2 + 0.278 H_2O_2 \rightarrow 0.333 IrO_3 + 0.111 Pr(HO)_3 + 0.111 H_2O$ | 1.25 | −0.059 |
| Nd | $0.278 H_2O_2 + 0.444 Nd_{0.25}Ir_{0.75}O_2 \rightarrow 0.333 IrO_3 + 0.111 Nd(HO)_3 + 0.111 H_2O$ | 1.25 | −0.057 |
| Sm | $0.269 H_2O_2 + 0.462 Sm_{0.25}Ir_{0.75}O_2 \rightarrow 0.308 IrO_3 + 0.038 Sm_3IrO_7 + 0.269 H_2O$ | 1.16 | −0.054 |
| Eu | $0.273 H_2O_2 + 0.727 Eu_{0.25}Ir_{0.75}O_2 \rightarrow 0.364 IrO_3 + 0.091 Eu_2Ir_2O_7 + 0.273 H_2O$ | 0.75 | −0.041 |
| Hf | $0.3 H_2O_2 + 0.4 Hf_{0.25}Ir_{0.75}O_2 \rightarrow 0.3 IrO_3 + 0.3 H_2O + 0.1 HfO_2$ | 1.50 | −0.061 |
| Ta | $0.318 H_2O_2 + 0.364 Ta_{0.25}Ir_{0.75}O_2 \rightarrow 0.273 IrO_3 + 0.318 H_2O + 0.045 Ta_2O_5$ | 1.75 | −0.100 |
| W | $0.1665 H_2O_2 + 0.667 Ir_{0.75}W_{0.25}O_2 \rightarrow 0.167 WO_3 + 0.5 IrO_2 + 0.167 H_2O$ | 0.50 | −0.140 |
| Re | $0.571 Re_{0.25}Ir_{0.75}O_2 + 0.2145 H_2O_2 \rightarrow 0.143 ReH_3O_5 + 0.429 IrO_2$ | 0.75 | −0.170 |
| Os | $0.25 H_2O_2 + 0.5 Ir_{0.75}Os_{0.25}O_2 \rightarrow 0.125 OsO_4 + 0.375 IrO_2 + 0.25 H_2O$ | 1.00 | −0.215 |
| Pt | $0.3 H_2O_2 + 0.4 Ir_{0.75}Pt_{0.25}O_2 \rightarrow 0.3 IrO_3 + 0.1 PtO_2 + 0.3 H_2O$ | 1.50 | −0.061 |
| Au | $0.278 H_2O_2 + 0.444 Ir_{0.75}Au_{0.25}O_2 \rightarrow 0.333 IrO_3 + 0.278 H_2O + 0.056 Au_2O_3$ | 1.25 | −0.056 |
| Tl | $0.278 H_2O_2 + 0.444 Tl_{0.25}Ir_{0.75}O_2 \rightarrow 0.333 IrO_3 + 0.056 Tl_2O_3 + 0.278 H_2O$ | 1.25 | −0.056 |
| Bi | $0.4 Bi_{0.25}Ir_{0.75}O_2 + 0.3 H_2O_2 \rightarrow 0.1 BiO_2 + 0.3 IrO_3 + 0.3 H_2O$ | 1.50 | −0.059 |

TABLE 6

Chemical reactivity of $Ir_{0.75}M_{0.25}O_2$ against OOH

| Ref. | OOH Reaction for $IrO_2$ | Ratio | $E_{rxn,\ OOH}$ |
|---|---|---|---|
| $IrO_2$ | $0.4 HO_2 + 0.6 IrO_2 \rightarrow 0.6 IrO_3 + 0.2 H_2O$ | 0.67 | −0.032 |
| M | OOH Reaction for $Ir_{0.75}M_{0.25}O_2$ | Ratio | $E_{rxn,\ OOH}$ |
| Ca | $0.333 HO_2 + 0.667 Ca_{0.25}Ir_{0.75}O_2 \rightarrow 0.5 IrO_3 + 0.167 Ca(HO)_2 + 0.083 O_2$ | 0.50 | −0.032 |
| Ti | $0.333 HO_2 + 0.667 Ti_{0.25}Ir_{0.75}O_2 \rightarrow 0.5 IrO_3 + 0.167 H_2O + 0.167 TiO_2$ | 0.50 | −0.027 |
| Ge | $0.333 HO_2 + 0.667 Ge_{0.25}Ir_{0.75}O_2 \rightarrow 0.5 IrO_3 + 0.167 GeO_2 + 0.167 H_2O$ | 0.50 | −0.027 |
| Se | $0.4 HO_2 + 0.6 Ir_{0.75}Se_{0.25}O_2 \rightarrow 0.05 H_4SeO_5 + 0.45 IrO_3 + 0.1 H_2SeO_4$ | 0.67 | −0.048 |
| Y | $0.294 HO_2 + 0.706 Y_{0.25}Ir_{0.75}O_2 \rightarrow 0.529 IrO_3 + 0.176 YHO_2 + 0.059 H_2O$ | 0.42 | −0.022 |
| Zr | $0.333 HO_2 + 0.667 Zr_{0.25}Ir_{0.75}O_2 \rightarrow 0.5 IrO_3 + 0.167 H_2O + 0.167 ZrO_2$ | 0.50 | −0.027 |
| Nb | $0.368 HO_2 + 0.632 Nb_{0.25}Ir_{0.75}O_2 \rightarrow 0.474 IrO_3 + 0.079 Nb_2O_5 + 0.184 H_2O$ | 0.58 | −0.076 |
| Mo | $0.143 HO_2 + 0.857 Mo_{0.25}Ir_{0.75}O_2 \rightarrow 0.214 MoO_3 + 0.071 H_2O + 0.643 IrO_2$ | 0.17 | −0.119 |
| Ru | $0.25 HO_2 + 0.75 Ir_{0.75}Ru_{0.25}O_2 \rightarrow 0.187 RuO_4 + 0.563 IrO_2 + 0.125 H_2O$ | 0.33 | −0.098 |
| Rh | $0.333 HO_2 + 0.667 Ir_{0.75}Rh_{0.25}O_2 \rightarrow 0.5 IrO_3 + 0.167 H_2O + 0.167 RhO_2$ | 0.50 | −0.027 |
| Pd | $0.333 HO_2 + 0.667 Ir_{0.75}Pd_{0.25}O_2 \rightarrow 0.5 IrO_3 + 0.167 PdO_2 + 0.167 H_2O$ | 0.50 | −0.027 |
| Ag | $0.294 HO_2 + 0.706 Ag_{0.25}Ir_{0.75}O_2 \rightarrow 0.176 AgHO_2 + 0.529 IrO_3 + 0.059 H_2O$ | 0.42 | −0.026 |
| Sn | $0.333 HO_2 + 0.667 Sn_{0.25}Ir_{0.75}O_2 \rightarrow 0.5 IrO_3 + 0.167 SnO_2 + 0.167 H_2O$ | 0.50 | −0.027 |
| Sb | $0.632 Sb_{0.25}Ir_{0.75}O_2 + 0.368 HO_2 \rightarrow 0.474 IrO_3 + 0.079 Sb_2O_5 + 0.184 H_2O$ | 0.58 | −0.058 |
| Ba | $0.143 HO_2 + 0.857 Ba_{0.25}Ir_{0.75}O_2 \rightarrow 0.214 Ba(IrO_3)_2 + 0.214 IrO_3 + 0.071 H_2O$ | 0.17 | −0.012 |
| La | $0.28 HO_2 + 0.72 La_{0.25}Ir_{0.75}O_2 \rightarrow 0.48 IrO_3 + 0.06 La_3IrO_7 + 0.14 H_2O$ | 0.39 | −0.018 |
| Ce | $0.333 HO_2 + 0.667 Ce_{0.25}Ir_{0.75}O_2 \rightarrow 0.5 IrO_3 + 0.167 CeO_2 + 0.167 H_2O$ | 0.50 | −0.027 |
| Pr | $0.712 Pr_{0.25}Ir_{0.75}O_2 + 0.288 HO_2 \rightarrow 0.027 Pr_3IrO_7 + 0.507 IrO_3 + 0.096 Pr(HO)_3$ | 0.40 | −0.026 |
| Nd | $0.288 HO_2 + 0.712 Nd_{0.25}Ir_{0.75}O_2 \rightarrow 0.027 Nd_3IrO_7 + 0.507 IrO_3 + 0.096 Nd(HO)_3$ | 0.40 | −0.024 |
| Sm | $0.28 HO_2 + 0.72 Sm_{0.25}Ir_{0.75}O_2 \rightarrow 0.48 IrO_3 + 0.06 Sm_3IrO_7 + 0.14 H_2O$ | 0.39 | −0.023 |
| Eu | $0.2 HO_2 + 0.8 Eu_{0.25}Ir_{0.75}O_2 \rightarrow 0.4 IrO_3 + 0.1 Eu_2Ir_2O_7 + 0.1 H_2O$ | 0.25 | −0.016 |
| Hf | $0.333 HO_2 + 0.667 Hf_{0.25}Ir_{0.75}O_2 \rightarrow 0.5 IrO_3 + 0.167 H_2O + 0.167 HfO_2$ | 0.50 | −0.027 |
| Ta | $0.368 HO_2 + 0.632 Ta_{0.25}Ir_{0.75}O_2 \rightarrow 0.474 IrO_3 + 0.184 H_2O + 0.079 Ta_2O_5$ | 0.58 | −0.076 |
| W | $0.143 HO_2 + 0.857 Ir_{0.75}W_{0.25}O_2 \rightarrow 0.214 WO_3 + 0.643 IrO_2 + 0.071 H_2O$ | 0.17 | −0.136 |

TABLE 6-continued

| Chemical reactivity of $Ir_{0.75}M_{0.25}O_2$ against OOH | | | |
|---|---|---|---|
| Re | $0.8\ Re_{0.25}Ir_{0.75}O_2 + 0.2\ HO_2 \rightarrow 0.067\ ReH_3O_5 + 0.067\ Re_2O_7 + 0.6\ IrO_2$ | 0.25 | −0.168 |
| Os | $0.25\ HO_2 + 0.75\ Ir_{0.75}Os_{0.25}O_2 \rightarrow 0.187\ OsO_4 + 0.563\ IrO_2 + 0.125\ H_2O$ | 0.33 | −0.228 |
| Pt | $0.333\ HO_2 + 0.667\ Ir_{0.75}Pt_{0.25}O_2 \rightarrow 0.5\ IrO_3 + 0.167\ PtO_2 + 0.167\ H_2O$ | 0.50 | −0.027 |
| Au | $0.294\ HO_2 + 0.706\ Ir_{0.75}Au_{0.25}O_2 \rightarrow 0.529\ IrO_3 + 0.147\ H_2O + 0.088\ Au_2O_3$ | 0.42 | −0.024 |
| Tl | $0.294\ HO_2 + 0.706\ Tl_{0.25}Ir_{0.75}O_2 \rightarrow 0.529\ IrO_3 + 0.088\ Tl_2O_3 + 0.147\ H_2O$ | 0.42 | −0.024 |
| Bi | $0.667\ Bi_{0.25}Ir_{0.75}O_2 + 0.333\ HO_2 \rightarrow 0.167\ BiO_2 + 0.5\ IrO_3 + 0.167\ H_2O$ | 0.50 | −0.023 |

TABLE 7

| Chemical reactivity of $Ir_{0.75}M_{0.25}O_2$ against $O_2$ | | | |
|---|---|---|---|
| Ref. | $O_2$ Reaction for $IrO_2$ | Ratio | $E_{rxn,\ O}$ |
| $IrO_2$ | $0.25\ O_2 + 0.5\ IrO_2 \rightarrow 0.5\ IrO_3$ | 0.50 | −0.040 |
| M | O→ Reaction for $Ir_{0.75}M_{0.25}O$→ | Ratio | $E_{rxn,\ O}$ |
| Ca | $0.2\ O_2 + 0.8\ Ca_{0.25}Ir_{0.75}O_2 \rightarrow 0.6\ IrO_3 + 0.2\ CaO$ | 0.25 | −0.015 |
| Ti | $0.2145\ O_2 + 0.571\ Ti_{0.25}Ir_{0.75}O_2 \rightarrow 0.429\ IrO_3 + 0.143\ TiO_2$ | 0.38 | −0.032 |
| Ge | $0.2145\ O_2 + 0.571\ Ge_{0.25}Ir_{0.75}O_2 \rightarrow 0.429\ IrO_3 + 0.143\ GeO_2$ | 0.38 | −0.032 |
| Se | $0.2335\ O_2 + 0.533\ Ir_{0.75}Se_{0.25}O_2 \rightarrow 0.067\ Se_2O_5 + 0.4\ IrO_3$ | 0.44 | −0.039 |
| Y | $0.238\ O_2 + 0.762\ Y_{0.25}Ir_{0.75}O_2 \rightarrow 0.571\ IrO_3 + 0.095\ Y_2O_3$ | 0.31 | −0.022 |
| Zr | $0.2145\ O_2 + 0.571\ Zr_{0.25}Ir_{0.75}O_2 \rightarrow 0.429\ IrO_3 + 0.143\ ZrO_2$ | 0.38 | −0.032 |
| Nb | $0.2335\ O_2 + 0.533\ Nb_{0.25}Ir_{0.75}O_2 \rightarrow 0.4\ IrO_3 + 0.067\ Nb_2O_5$ | 0.44 | −0.093 |
| Mo | $0.25\ O_2 + 0.5\ Mo_{0.25}Ir_{0.75}O_2 \rightarrow 0.375\ IrO_3 + 0.125\ MoO_3$ | 0.50 | −0.134 |
| Ru | $0.278\ O_2 + 0.444\ Ir_{0.75}Ru_{0.25}O_2 \rightarrow 0.333\ IrO_3 + 0.111\ RuO_4$ | 0.63 | −0.121 |
| Rh | $0.2145\ O_2 + 0.571\ Ir_{0.75}Rh_{0.25}O_2 \rightarrow 0.429\ IrO_3 + 0.143\ RhO_2$ | 0.38 | −0.032 |
| Pd | $0.2145\ O_2 + 0.571\ Ir_{0.75}Pd_{0.25}O_2 \rightarrow 0.429\ IrO_3 + 0.143\ PdO_2$ | 0.38 | −0.032 |
| Ag | $0.184\ O_2 + 0.632\ Ag_{0.25}Ir_{0.75}O_2 \rightarrow 0.053\ Ag_3O_4 + 0.474\ IrO_3$ | 0.29 | −0.026 |
| Sn | $0.2145\ O_2 + 0.571\ Sn_{0.25}Ir_{0.75}O_2 \rightarrow 0.429\ IrO_3 + 0.143\ SnO_2$ | 0.38 | −0.032 |
| Sb | $0.2335\ O_2 + 0.533\ Sb_{0.25}Ir_{0.75}O_2 \rightarrow 0.4\ IrO_3 + 0.067\ Sb_2O_5$ | 0.44 | −0.071 |
| Ba | $0.1\ O_2 + 0.8\ Ba_{0.25}Ir_{0.75}O_2 \rightarrow 0.2\ IrO_3 + 0.2\ Ba(IrO_3)_2$ | 0.13 | −0.012 |
| La | $0.184\ O_2 + 0.632\ La_{0.25}Ir_{0.75}O_2 \rightarrow 0.421\ IrO_3 + 0.053\ La_3IrO_7$ | 0.29 | −0.020 |
| Ce | $0.2145\ O_2 + 0.571\ Ce_{0.25}Ir_{0.75}O_2 \rightarrow 0.429\ IrO_3 + 0.143\ CeO_2$ | 0.38 | −0.032 |
| Pr | $0.184\ O_2 + 0.632\ Pr_{0.25}Ir_{0.75}O_2 \rightarrow 0.421\ IrO_3 + 0.053\ Pr_3IrO_7$ | 0.29 | −0.026 |
| Nd | $0.184\ O_2 + 0.632\ Nd_{0.25}Ir_{0.75}O_2 \rightarrow 0.421\ IrO_3 + 0.053\ Nd_3IrO_7$ | 0.29 | −0.026 |
| Sm | $0.184\ O_2 + 0.632\ Sm_{0.25}Ir_{0.75}O_2 \rightarrow 0.421\ IrO_3 + 0.053\ Sm_3IrO_7$ | 0.29 | −0.026 |
| Eu | $0.1365\ O_2 + 0.727\ Eu_{0.25}Ir_{0.75}O_2 \rightarrow 0.364\ IrO_3 + 0.091\ Eu_2Ir_2O_7$ | 0.19 | −0.018 |
| Hf | $0.2145\ O_2 + 0.571\ Hf_{0.25}Ir_{0.75}O_2 \rightarrow 0.429\ IrO_3 + 0.143\ HfO_2$ | 0.38 | −0.032 |
| Ta | $0.2335\ O_2 + 0.533\ Ta_{0.25}Ir_{0.75}O_2 \rightarrow 0.4\ IrO_3 + 0.067\ Ta_2O_5$ | 0.44 | −0.093 |
| W | $0.25\ O_2 + 0.5\ Ir_{0.75}W_{0.25}O_2 \rightarrow 0.375\ IrO_3 + 0.125\ WO_3$ | 0.50 | −0.149 |
| Re | $0.1365\ O_2 + 0.727\ Re_{0.25}Ir_{0.75}O_2 \rightarrow 0.091\ Re_2O_7 + 0.545\ IrO_2$ | 0.19 | −0.185 |
| Os | $0.1665\ O_2 + 0.667\ Ir_{0.75}Os_{0.25}O_2 \rightarrow 0.167\ OsO_4 + 0.5\ IrO_2$ | 0.25 | −0.260 |
| Pt | $0.2145\ O_2 + 0.571\ Ir_{0.75}Pt_{0.25}O_2 \rightarrow 0.429\ IrO_3 + 0.143\ PtO_2$ | 0.38 | −0.032 |
| Au | $0.1925\ O_2 + 0.615\ Ir_{0.75}Au_{0.25}O_2 \rightarrow 0.462\ IrO_3 + 0.077\ Au_2O_3$ | 0.31 | −0.028 |
| Tl | $0.1925\ O_2 + 0.615\ Tl_{0.25}Ir_{0.75}O_2 \rightarrow 0.077\ Tl_2O_3 + 0.462\ IrO_3$ | 0.31 | −0.028 |
| Bi | $0.2145\ O_2 + 0.571\ Bi_{0.25}Ir_{0.75}O_2 \rightarrow 0.429\ IrO_3 + 0.143\ BiO_2$ | 0.38 | −0.028 |

To study the CO poisoning or corrosion, chemical reactivity was studied against CO. CO reactions follow the same trend as reducing conditions i.e., H and $H_3O$ reactions above.

TABLE 8

| Chemical reactivity of $Ir_{0.75}M_{0.25}O_2$ against CO | | | |
|---|---|---|---|
| Ref. | CO Reaction | Ratio | $E_{rxn,\ CO}$ |
| $IrO_2$ | $0.333\ IrO_2 + 0.667\ CO \rightarrow 0.667\ CO_2 + 0.333\ Ir$ | 2.00 | −0.532 |
| M | CO Reaction | Ratio | $E_{rxn,\ CO}$ |
| Ca | $0.364\ Ca_{0.25}Ir_{0.75}O_2 + 0.636\ CO \rightarrow 0.545\ CO_2 + 0.091\ CaCO_3 + 0.273\ Ir$ | 1.75 | −0.622 |
| Ti | $0.4\ Ti_{0.25}Ir_{0.75}O_2 + 0.6\ CO \rightarrow 0.6\ CO_2 + 0.1\ TiO_2 + 0.3\ Ir$ | 1.50 | −0.465 |
| Ge | $0.4\ Ge_{0.25}Ir_{0.75}O_2 + 0.6\ CO \rightarrow 0.6\ CO_2 + 0.1\ GeO_2 + 0.3\ Ir$ | 1.50 | −0.465 |
| Se | $0.667\ CO + 0.333\ Ir_{0.75}Se_{0.25}O_2 \rightarrow 0.667\ CO_2 + 0.208\ Ir + 0.042\ IrSe_2$ | 2.00 | −0.561 |
| Y | $0.381\ Y_{0.25}Ir_{0.75}O_2 + 0.619\ CO \rightarrow 0.619\ CO_2 + 0.048\ Y_2O_3 + 0.286\ Ir$ | 1.62 | −0.515 |
| Zr | $0.4\ Zr_{0.25}Ir_{0.75}O_2 + 0.6\ CO \rightarrow 0.6\ CO_2 + 0.1\ ZrO_2 + 0.3\ Ir$ | 1.50 | −0.465 |
| Nb | $0.421\ Nb_{0.25}Ir_{0.75}O_2 + 0.579\ CO \rightarrow 0.053\ Nb_2O_5 + 0.579\ CO_2 + 0.316\ Ir$ | 1.38 | −0.445 |

TABLE 8-continued

| Chemical reactivity of $Ir_{0.75}M_{0.25}O_2$ against CO | | | |
|---|---|---|---|
| Mo | $0.667\ CO + 0.333\ Mo_{0.25}Ir_{0.75}O_2 \rightarrow 0.667\ CO_2 + 0.083\ MoIr_3$ | 2.00 | −0.488 |
| Ru | $0.333\ Ir_{0.75}Ru_{0.25}O_2 + 0.667\ CO \rightarrow 0.083\ Ir_3Ru + 0.667\ CO_2$ | 2.00 | −0.517 |
| Rh | $0.333\ Ir_{0.75}Rh_{0.25}O_2 + 0.667\ CO \rightarrow 0.083\ Ir_3Rh + 0.667\ CO_2$ | 2.00 | −0.539 |
| Pd | $0.333\ Ir_{0.75}Pd_{0.25}O_2 + 0.667\ CO \rightarrow 0.667\ CO_2 + 0.25\ Ir + 0.083\ Pd$ | 2.00 | −0.589 |
| Ag | $0.333\ Ag_{0.25}Ir_{0.75}O_2 + 0.667\ CO \rightarrow 0.667\ CO_2 + 0.083\ Ag + 0.25\ Ir$ | 2.00 | −0.629 |
| Sn | $0.6\ CO + 0.4\ Sn_{0.25}Ir_{0.75}O_2 \rightarrow 0.6\ CO_2 + 0.1\ SnO_2 + 0.3\ Ir$ | 1.50 | −0.465 |
| Sb | $0.333\ Sb_{0.25}Ir_{0.75}O_2 + 0.667\ CO \rightarrow 0.042\ Sb_2Ir + 0.667\ CO_2 + 0.208\ Ir$ | 2.00 | −0.490 |
| Ba | $0.364\ Ba_{0.25}Ir0.75O_2 + 0.636\ CO \rightarrow 0.545\ CO_2 + 0.091\ BaCO_3 + 0.273\ Ir$ | 1.75 | −0.585 |
| La | $0.381\ La_{0.25}Ir_{0.75}O_2 + 0.619\ CO \rightarrow 0.048\ La_2CO_5 + 0.571\ CO_2 + 0.286\ Ir$ | 1.62 | −0.534 |
| Ce | $0.6\ CO + 0.4\ Ce_{0.25}Ir_{0.75}O_2 \rightarrow 0.1\ CeO_2 + 0.6\ CO_2 + 0.3\ Ir$ | 1.50 | −0.465 |
| Pr | $0.381\ Pr_{0.25}Ir_{0.75}O_2 + 0.619\ CO \rightarrow 0.619\ CoO + 0.048\ Pr_2O_3 + 0.286\ Ir$ | 1.62 | −0.355 |
| Nd | $0.381\ Nd_{0.25}Ir_{0.75}O_2 + 0.619\ CO \rightarrow 0.619\ CO_2 + 0.048\ Nd_2O_3 + 0.286\ Ir$ | 1.62 | −0.510 |
| Sm | $0.381\ Sm_{0.25}Ir_{0.75}O_2 + 0.619\ CO \rightarrow 0.619\ CO_2 + 0.048\ Sm_2O_3 + 0.286\ Ir$ | 1.62 | −0.511 |
| Eu | $0.364\ Eu_{0.25}Ir_{0.75}O_2 + 0.636\ CO \rightarrow 0.545\ CO_2 + 0.091\ EuCO_3 + 0.273\ Ir$ | 1.75 | −0.548 |
| Hf | $0.4\ Hf_{0.25}Ir_{0.75}O_2 + 0.6\ CO \rightarrow 0.6\ CO_2 + 0.1\ HfO_2 + 0.3\ Ir$ | 1.50 | −0.465 |
| Ta | $0.421\ Ta_{0.25}Ir_{0.75}O_2 + 0.579\ CO \rightarrow 0.579\ CO_2 + 0.053\ Ta_2O_5 + 0.316\ Ir$ | 1.38 | −0.445 |
| W | $0.667\ CO + 0.333\ Ir_{0.75}W_{0.25}O_2 \rightarrow 0.667\ CO_2 + 0.083\ Ir_3W$ | 0.50 | −0.477 |
| Re | $0.333\ Re_{0.25}Ir_{0.75}O_2 + 0.667\ CO \rightarrow 0.667\ CO_2 + 0.083\ ReIr_3$ | 2.00 | −0.451 |
| Os | $0.333\ Ir_{0.75}Os_{0.25}O_2 + 0.667\ CO \rightarrow 0.667\ CO_2 + 0.25\ Ir + 0.083\ Os$ | 2.00 | −0.523 |
| Pt | $0.333\ Ir_{0.75}Pt_{0.25}O_2 + 0.667\ CO \rightarrow 0.667\ CO_2 + 0.25\ Ir + 0.083\ Pt$ | 2.00 | −0.567 |
| Au | $0.333\ Ir_{0.75}Au_{0.25}O_2 + 0.667\ CO \rightarrow 0.667\ CO_2 + 0.25\ Ir + 0.083\ Au$ | 2.00 | −0.623 |
| Tl | $0.348\ Tl_{0.25}Ir_{0.75}O_2 + 0.652\ CO \rightarrow 0.043\ Tl_2CO_3 + 0.609\ CO_2 + 0.261\ Ir$ | 1.87 | −0.585 |
| Bi | $0.381\ Bi_{0.25}Ir_{0.75}O_2 + 0.619\ CO \rightarrow 0.571\ CO_2 + 0.048\ Bi_2CO_5 + 0.286\ Ir$ | 1.62 | −0.523 |

Figure 5:
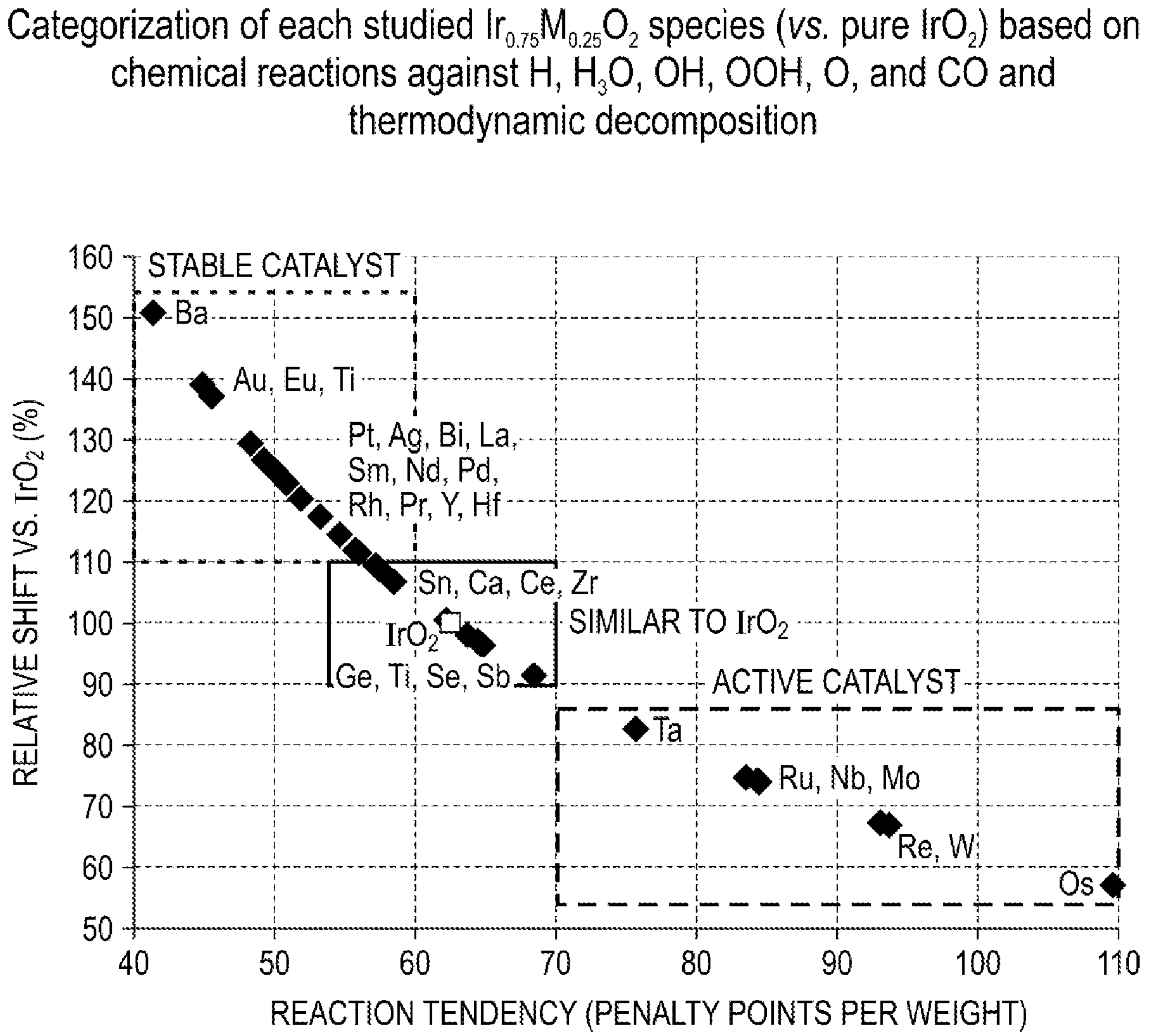
FIG. 5 shows a plot categorizing each studied $Ir_{0.75}M_{0.25}O_2$ species (vs. pure $IrO_2$) based on chemical reactions against H, $H_3O$, OH, OOH, O, and CO and thermodynamic decomposition.

The results of the (a) thermodynamic decomposition analysis (i.e., tetragonal vs. non-tetragonal phase decomposition) and (b) data from the Tables 3-8 (chemical reactions against H, $H_3O$, OH, OOH, O, and CO) are shown in FIG. 5 depicting three categories by functionality—species that enhance 1) stability ("Stable Catalyst"), 2) activity ("Active Catalyst"), or are expected to have 3) similar behavior as pure $IrO_2$ ("Similar to $IrO_2$"). As can be observed from FIG. 5, the activity and/or stability of the OER catalyst and/or PEMFC electrode may be tuned by adding and/or replacing Ir- or Ru-based traditional materials with more economical, suitable, and attainable species. The discovery thus has a potential of saving cost, improving performance, durability, sustainability, and increasing production quantities feasibility as well as enabling large scale manufacture of the MEA, OER catalyst, and/or PEMFC electrode having at least comparable characteristics as a traditional $IrO_2$ OER catalyst. Tables 9-11 below further summarize the stability-enhancing and activity-enhancing ternary oxide species disclosed herein, focusing on known or unknown acid stability and practicality due to availability and lower cost of the herein-disclosed oxide species.

TABLE 9

Stability enhancing ternary oxide species

| Tiers for stability enhancing ternary oxide species | M in $Ir_{0.75}M_{0.25}O_2$ |
|---|---|
| S-tier 1: improves stability and contains practical element | Bi |
| S-tier 2: improves stability, but unknown acid stability | Y, La, Pr, Nd, Sm, Eu |
| S-tier 3: improves stability, but slightly expensive element (and, unknown acid stability) | Ag, Hf; (Ba) |
| S-tier 4: improves stability, but more expensive than Ru | Rh, Pd, Pt, Au, Tl |

TABLE 10

Activity enhancing ternary oxide species

| Tiers for activity enhancing ternary oxide species | M in $Ir_{0.75}M_{0.25}O_2$ |
|---|---|
| A-tier 1: improves activity and contains practical element | Nb, Mo, Ta, W |
| A-tier 2: improves activity, but expensive | Re, Ru, Os |

TABLE 11

Ternary oxide species with similar performance as $IrO_2$

| Tiers for cost saving ternary oxide species | M in $Ir_{0.75}M_{0.25}O_2$ |
|---|---|
| C-tier 1: no disadvantage (similar to $IrO_2$ in FIG. 2) | Ti, Se, Zr, Sn, Sb, Ce |
| C-tier 2: unknown acid stability, or slightly expensive | Ca, Ge |

Similar screening process and analysis were repeated for an increased concentration of M and reduced amount of Ir for the S-tier 1, S-tier 2, A-tier 1, and C-tier 1 species from Tables 9-11: $Ir_{0.5}M_{0.5}O_2$ and $Ir_{0.25}M_{0.75}O_2$, respectively.

Figure 6:
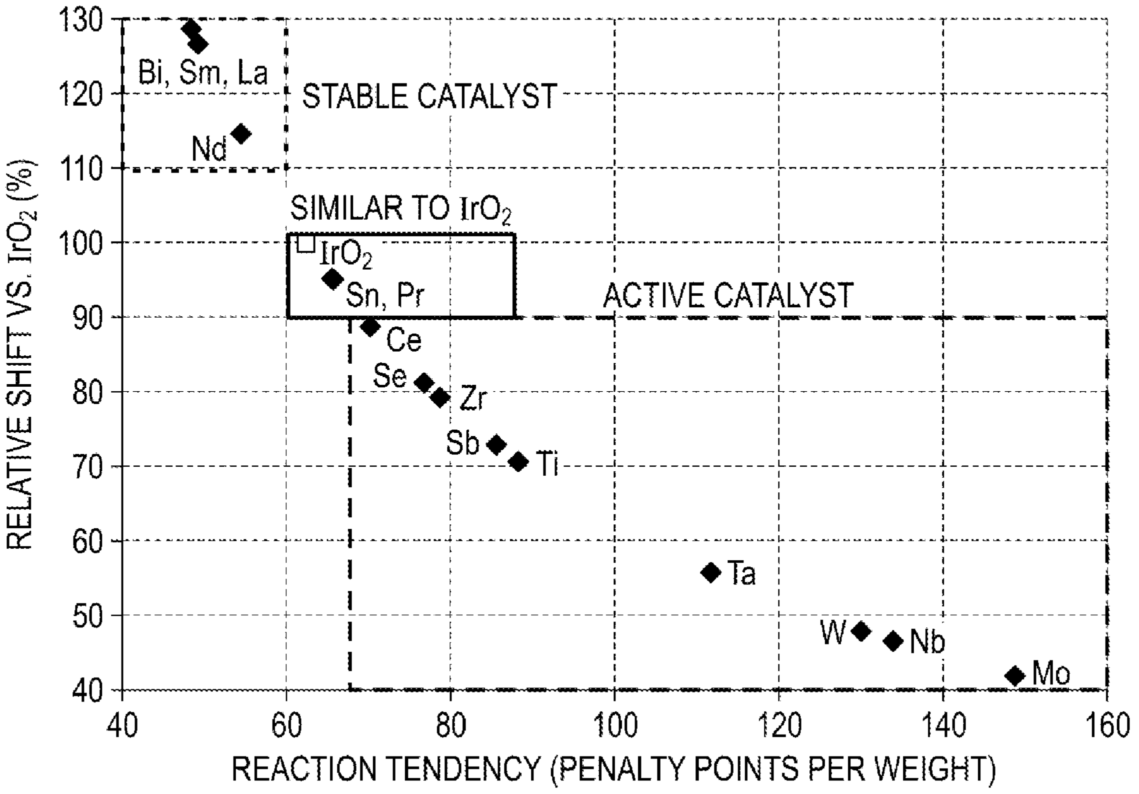
FIG. 6 shows a plot categorizing each studied $Ir_{0.5}M_{0.5}O_2$ species (vs. pure $IrO_2$) based on chemical reactions against H, $H_3O$, OH, OOH, O, and CO and thermodynamic decomposition.

From thermodynamic decomposition analysis, it was found that Ca and Y formed CaO and $Y_2O_3$ unstable in the acidic condition. In addition, Eu was eliminated from further screening due to $O_2$ gas release during thermodynamic decomposition. FIG. 6 and Table 12 show results of the analysis for 15 elements for $Ir_{0.5}M_{0.5}O_2$, where M=Ti, Se, Zr, Nb, Mo, Sn, Sb, La, Ce, Pr, Nd, Sm, Ta, W, and Bi. FIG. 6 depicts three categories by functionality—species that enhance 1) stability, 2) activity, or are expected to 3) have similar behavior as pure $IrO_2$.

TABLE 12

| Assignment of different tiers for OER catalysts leading to stability/activity enhancement, or cost saving with metal substitution in Iro.5Mo.5O2 | |
|---|---|
| | M in $Ir_{0.5}M_{0.5}O_2$ |
| Tiers for stability enhancing OER catalyst | |
| S-tier1: improves stability and includes practical element | Bi |
| S-tier2: improves stability, but acid stability unknown | La, Nd, Sm |
| Tiers for activity enhancing OER catalyst | |
| A-tier1: improves activity and includes practical element | Ti, Se, Zr, Sb, Ce, Ta, W, Nb |
| A-tier2: improves activity, but might be too active (less stable) | Mo |
| Tiers for cost saving OER catalyst | |
| C-tier1: no disadvantage (similar to $IrO_2$) | Sn |
| C-tier2: unknown acid stability | Pr |

Figure 7:
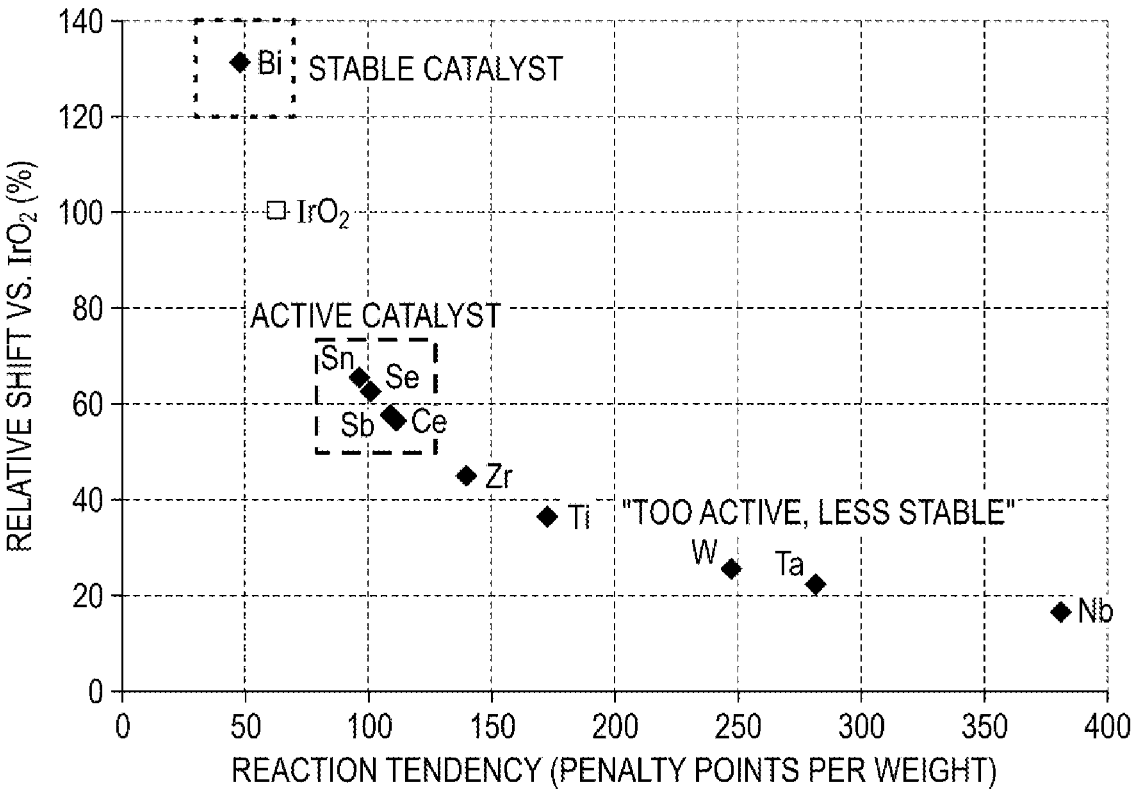
FIG. 7 shows a plot categorizing each studied $Ir_{0.25}M_{0.75}O_2$ species (vs. pure $IrO_2$) based on chemical reactions against H, $H_3O$, OH, OOH, O, and CO and thermodynamic decomposition.

FIG. 7 and Table 13 show results of the analysis for 10 elements (1st-tier $Ir_{0.5}M_{0.5}O_2$ oxide species) for $Ir_{0.25}M_{0.75}O_2$, where M=Bi, Ti, Se, Zr, Sb, Ce, Ta, W, Nb, and Sn. FIG. 7 depicts three categories by functionality—species that enhance 1) stability, 2) activity, or 3) are expected to have similar behavior as pure $IrO_2$. As can be seen in FIG. 7 and Table 13, in reduced Ir concentration, Bi substitution may lead to stability while adding other elements shifts the species to become more active. Yet, when activity is too high, it is likely that the material will become less stable.

The described research revealed the overall capabilities of the following studied species, captured in Table 13.

TABLE 13

| $Ir_{0.75}M_{0.25}O_2$ species summary | |
|---|---|
| | M in $Ir_{0.75}M_{0.25}O_2$ |
| Tiers for stability enhancing OER catalyst | |
| S-tier1: improves stability and includes practical element | Bi |
| Tiers for activity enhancing OER catalyst | |
| A-tier1: improves activity and includes practical element | Se, Sn, Sb, Ce |
| A-tier2: improves activity, but might be too active (less stable) | Ti, Zr, Ta, W, Nb |

Based on the findings summarized in Table 13, various compositions of Ir—Bi-M-O material, where M=Se, Sn, Sb, and Ce were analyzed. The quaternary system may supply the stability-increasing Bi in combination with an activity-enhancing element and cost savings due to the use of less expensive elements than Ir. Comparison of $Ir_{0.33}Bi_{0.33}M_{0.33}O_2$ composition with $Ir_{0.25}Bi_{0.25}M_{0.5}O_2$ shows that as concentration of Se, Sn, Sb, and Ce increases, the material becomes more active. When the amount of Bi increases in $Ir_{0.33}Bi_{0.33}M_{0.33}O_2$ to $Ir_{0.25}Bi_{0.5}M_{0.25}O_2$, the corresponding material is predicted to become more stable. The results are summarized in Table 14 below.

In the plot of FIG. 7, a stable catalyst is one having relative shift >=110% and an active catalyst as having relative shift <=90%. There is a strong correlation between the x and y axes since the axes are not independent. The x axis is a summation of the penalty points (PP) by weight and the y axis is a % difference between the sum of PP for $IrO_2$ vs. $Ir_{0.75}M_{0.25}O_2$. The sum of PP includes PP for chemical reactions against H, $H_3O$, OH, OOH, O, and CO, and thermodynamic decomposition.

TABLE 14

| Quaternary Ir—Bi—M—O compositions tested in comparison with pure $IrO_2$ as an OER catalyst in a PEM electrolyzer application | | |
|---|---|---|
| Composition tested | Relative shift vs. $IrO_2$ (%) | Advantages vs. pure $IrO_2$ |
| $Ir_{0.33}Bi_{0.33}Se_{0.33}O_2$ | 127.9 | Stability, Cost |
| $Ir_{0.33}Bi_{0.33}Sn_{0.33}O_2$ | 108.6 | Cost |
| $Ir_{0.33}Bi_{0.33}Sb_{0.33}O_2$ | 121.2 | Stability, Cost |
| $Ir_{0.33}Bi_{0.33}Ce_{0.33}O_2$ | 102.5 | Cost |
| $Ir_{0.25}Bi_{0.25}Se_{0.5}O_2$ | 107.5 | Cost |
| $Ir_{0.25}Bi_{0.25}Sn_{0.5}O_2$ | 89.1 | Activity, Cost |
| $Ir_{0.25}Bi_{0.25}Sb_{0.5}O_2$ | 91.0 | Cost |
| $Ir_{0.25}Bi_{0.25}Ce_{0.5}O_2$ | 82.2 | Activity, Cost |
| $Ir_{0.25}Bi_{0.5}Se_{0.25}O_2$ | 129.3 | Stability, Cost |
| $Ir_{0.25}Bi_{0.5}Sn_{0.25}O_2$ | 110.5 | Stability, Cost |
| $Ir_{0.25}Bi_{0.5}Sb_{0.25}O_2$ | 124.7 | Stability, Cost |
| $Ir_{0.25}Bi_{0.5}Ce_{0.25}O_2$ | 106.6 | Cost |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A catalyst for a membrane electrode assembly (MBA) comprising:

a ternary oxide material having at least one composition of formula (I):

$$Ir_xM_{1-x}O_2 \quad (I),$$

where x is any number between about 0.25 and 0.75, and

M is Ag, Au, Eu, Ge, Hf, Nd, Os, Pd, Pr, Re, Rh, Se, Sm, Ti, or W, the ternary material being configured to catalyze an oxygen evolution reaction (OER) in the MBA and to increase stability, activity, or both of the catalyst; and a quaternary oxide material having at least one composition of formula (II):

$$Ir_xBi_yM_zO_2 \quad (II)$$

where x, y, z is each individually and independently any number between about 0.25 and 0.75, x+y+z=1, and M is Ag, Au, Ba, Ca, Ce, Eu, Ge, Hf, La, Mo, Nb, Nd, Os, Pd, Pt, Pr, Re, Rh, Ru, Se, Sm, Ta, TI, Ti, W, or Zr, the quaternary material being configured to catalyze an oxygen evolution reaction (OER) and increase stability, activity, or both of the catalyst.

2. The catalyst of claim 1, wherein the MEA is an electrolyzer MEA.

3. The catalyst of claim 1, wherein the catalyst comprises a first composition and a second composition of the formula (I), the first and second compositions having different M, x values, or both.

4. The catalyst of claim 1, wherein M in formula (I) is Se.

5. The catalyst of claim 1, wherein x in formula (I) is about 0.25 to 0.5.

6. The catalyst of claim 1, wherein the catalyst further comprises at most about 50 wt. % of pure Ir, Ru, $IrO_2$, $RuO_2$, or a combination thereof, based on the total weight of the catalyst.

7. The catalyst of claim 1, wherein the ternary oxide material forms a nanoparticle layer on an anode of the MEA.

8. The catalyst of claim 1, wherein the quaternary oxide material of formula (II) is combined with the ternary oxide material of formula (I) in a same layer.

9. The catalyst of claim 1, wherein the quaternary oxide material includes at least three different compositions of the formula (II).

10. The catalyst of claim 1, wherein the catalyst further comprises about 20-40 wt. % of Ir, Ru, $IrO_2$, $RuO_2$, or a combination thereof, based on a total weight of the catalyst material.

11. The catalyst of claim 1, wherein x in the formula (I) is about 0.25 to 0.49.

12. The catalyst of claim 1, wherein the MEA is a fuel cell MEA.

13. The catalyst of claim 1, wherein the quaternary oxide material includes at least two different compositions of the formula (II).

14. A membrane electrode assembly (MEA) comprising:

an OER catalyst material having a first material including (a) a ternary oxide material having at least one composition of formula (I):

$$Ir_xM_{1-x}O_2 \quad (I),$$

where x is any number between about 0.25-0.49 and 0.51-0.75; and

M is Ag, Au, Ba, Ca, Eu, Ge, Hf, La, Nd, Os, Pd, Pr, Re, Rh, Se, Sm, Tl, or W, and (b) a quaternary oxide material having at least one composition of formula (II):

$$Ir_xBi_yM_zO_2 \quad (II)$$

where x, y, z is each individually and independently any number between about 0.25 and 0.75, x+y+z=1, and Mis Ag, Au, Ba, Ca, Ce, Eu, Ge, Hf, La, Mo, Nb, Nd, Os, Pd, Pt, Pr, Re, Rh, Ru, Se, Sm, Ta, TI, Ti, W, or Zr, the material of the formulas (I) and (II) being configured to catalyze oxygen evolution reaction (OER) and increase stability, activity, or both of the catalyst.

15. The MEA of claim 14, wherein the MEA is an electrolyzer MEA.

16. The MEA of claim 14, wherein M in the formula (II) is Ce or Se.

17. The MEA of claim 14, wherein M in the formula (I) is Nd.

18. The catalyst of claim 14, wherein the first material further comprises at most about 50 wt. % of Ir, Ru, $IrO_2$, $RuO_2$, or a combination thereof, based on the total weight of the first material.

* * * * *